United States Patent
Mueller et al.

(10) Patent No.: US 10,974,575 B2
(45) Date of Patent: Apr. 13, 2021

(54) VEHICLE ROOF WITH SUPPORT PORTION AND ROLLER BLIND ASSEMBLY

(71) Applicant: Webasto SE, Stockdorf (DE)

(72) Inventors: Mathias Mueller, Stockdorf (DE); Günter Tirpitz, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 56 days.

(21) Appl. No.: 16/468,513

(22) PCT Filed: Nov. 15, 2017

(86) PCT No.: PCT/EP2017/079285
§ 371 (c)(1),
(2) Date: Jun. 11, 2019

(87) PCT Pub. No.: WO2018/114147
PCT Pub. Date: Jun. 28, 2018

(65) Prior Publication Data
US 2019/0344645 A1 Nov. 14, 2019

(30) Foreign Application Priority Data

Dec. 21, 2016 (DE) .................... 10 2016 125 284.0

(51) Int. Cl.
*B60J 3/02* (2006.01)
*B60J 7/00* (2006.01)
(Continued)

(52) U.S. Cl.
CPC .............. *B60J 1/2063* (2013.01); *B60J 3/02* (2013.01); *B60J 7/0015* (2013.01); *B60J 7/022* (2013.01);
(Continued)

(58) Field of Classification Search
CPC ...... B60J 7/0015; B60J 1/2052; B60J 1/2063; B60J 3/02
(Continued)

(56) References Cited

U.S. PATENT DOCUMENTS

| 7,082,983 | B2* | 8/2006 | Coulibaly | B60J 1/2063 |
| | | | | 160/306 |
| 8,973,644 | B2* | 3/2015 | Munsters | E06B 9/44 |
| | | | | 160/313 |
| 2011/0204682 | A1* | 8/2011 | Kamei | B60J 7/0015 |
| | | | | 296/216.04 |

FOREIGN PATENT DOCUMENTS

| DE | 36 07 725 A1 | 9/1987 |
| DE | 197 46 543 A1 | 5/1999 |

(Continued)

OTHER PUBLICATIONS

International Preliminary Report on Patentability issued against PCT/EP2017/079285 dated Jun. 25, 2019.
(Continued)

*Primary Examiner* — Dennis H Pedder
(74) *Attorney, Agent, or Firm* — Fitch, Even, Tabin & Flannery, LLP

(57) ABSTRACT

A vehicle roof having at least one transparent roof portion, a roof-attached support portion and a roller blind assembly for selectively shading or at least partially exposing the transparent roof portion, the roller blind assembly having at least one roller blind unit comprising a roller blind web, which can be wound up into a roller blind coil, and a lateral bearing element on either side of the vertical longitudinal center plane of the roof. The roller blind coil can be disposed between the two lateral bearing elements. The roller blind assembly may have a bearing shell on top of which the at
(Continued)

least one roller blind unit is attached via the lateral bearing elements and which is fixed to the at least one support portion from below.

22 Claims, 20 Drawing Sheets

(51) Int. Cl.
   *B60J 1/20* (2006.01)
   *B60J 7/02* (2006.01)
   *B60R 13/02* (2006.01)
(52) U.S. Cl.
   CPC ..... *B60J 1/2052* (2013.01); *B60R 2013/0287* (2013.01)
(58) Field of Classification Search
   USPC ........................................................ 296/214
   See application file for complete search history.

(56) References Cited

FOREIGN PATENT DOCUMENTS

| | | |
|---|---|---|
| DE | 10 2004 020 337 A1 | 8/2005 |
| DE | 10 2005 056 608 A1 | 5/2007 |
| DE | 10 2014 005 476 A1 | 10/2015 |
| EP | 0 315 516 A1 | 5/1989 |
| EP | 2 327 576 A1 | 6/2011 |
| EP | 2 623 347 A1 | 8/2013 |
| GB | 190221715 A * | 11/1903 |
| GB | 190820657 A * | 6/1909 ............. A47H 1/142 |
| GB | 467497 A * | 6/1937 ............... E06B 9/50 |

OTHER PUBLICATIONS

International Search Report for PCT/EP2017/079285 dated Mar. 21, 2018 (7 Pages).

* cited by examiner

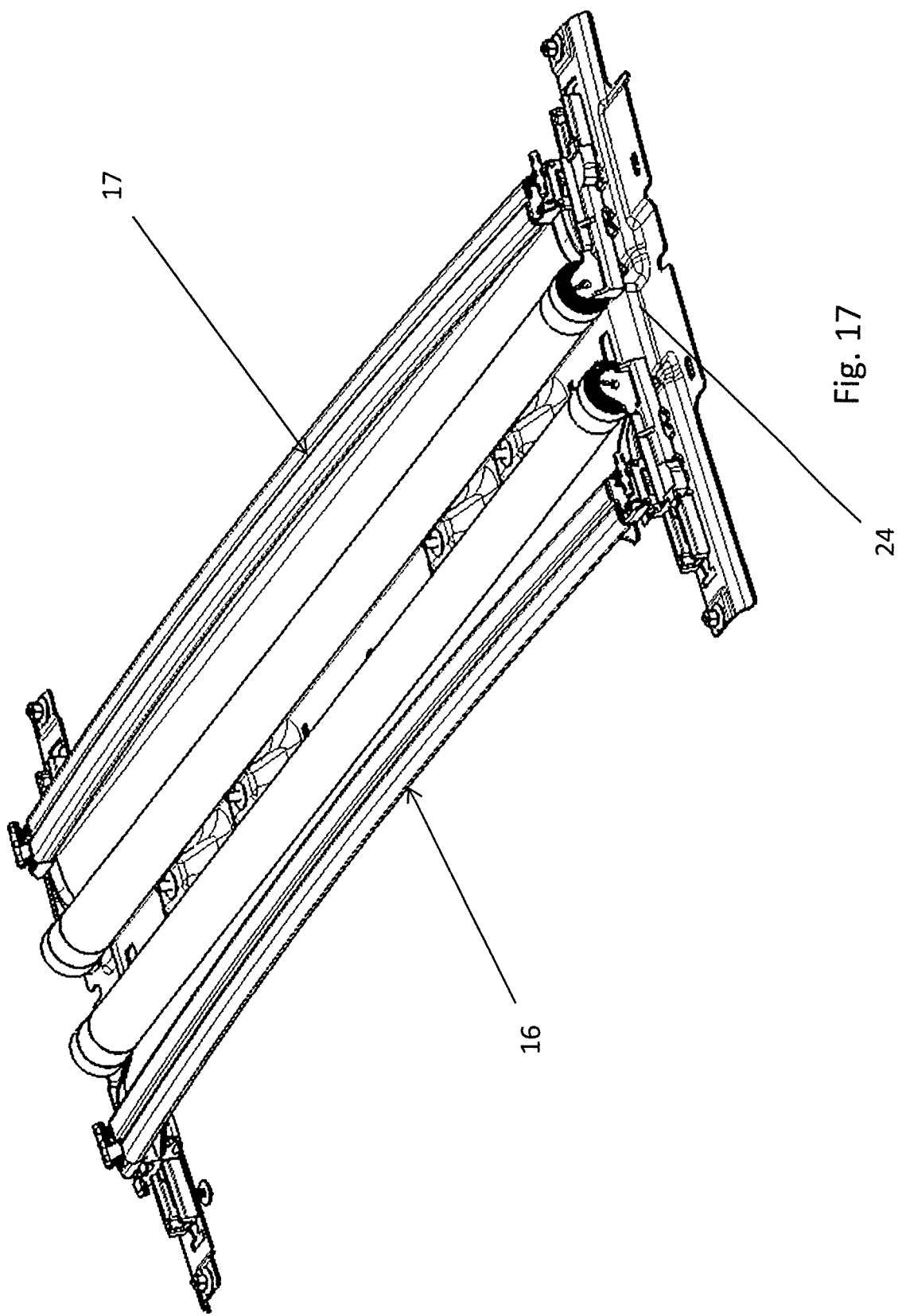

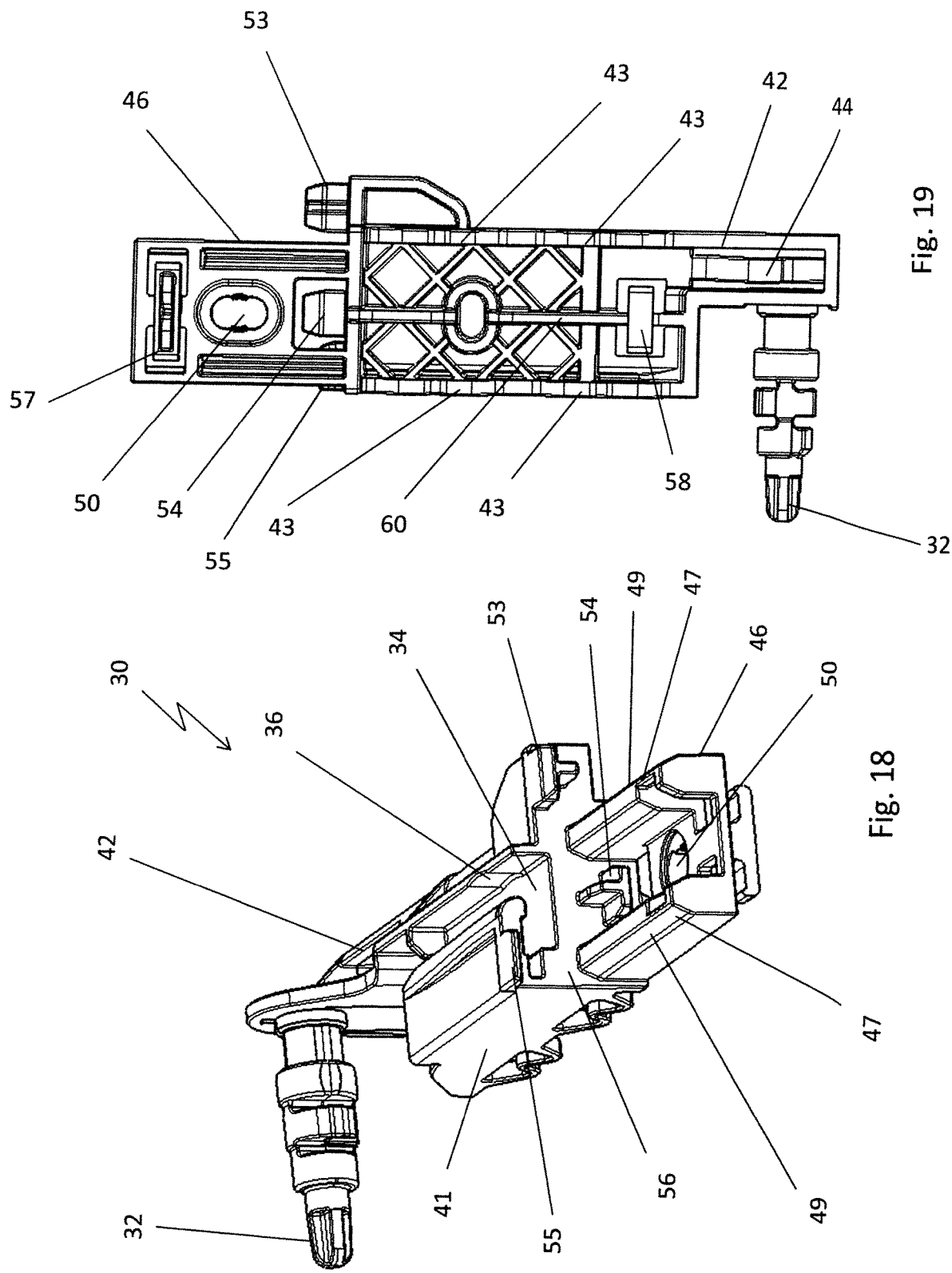

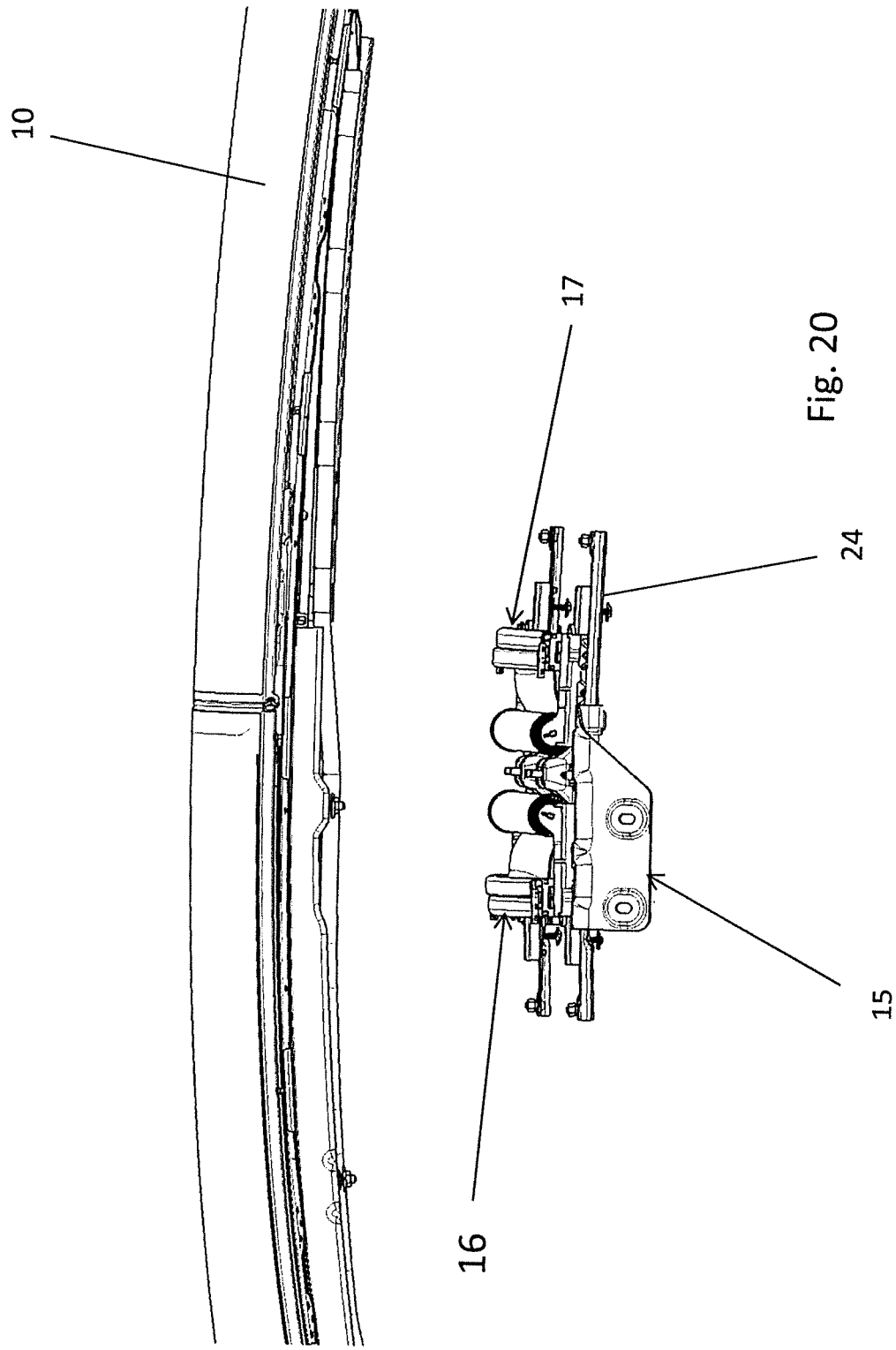

VEHICLE ROOF WITH SUPPORT PORTION AND ROLLER BLIND ASSEMBLY

CROSS-REFERENCE TO RELATED APPLICATIONS

This application is a U.S. national phase application filed under 35 U.S.C. § 371 of International Application No. PCT/EP2017/079285, filed Nov. 15, 2017, designating the United States, which claims priority from German Patent Application No. 10 2016 125 284.0, filed Dec. 21, 2016, which are hereby incorporated herein by reference in their entirety for all purposes.

FIELD

The invention relates to a vehicle roof having the features of the preamble of claim 1.

BACKGROUND

A vehicle roof of this kind is known from practice and comprises at least one, preferably two transparent roof portions, one of which is formed by a glass lid element of a sunroof assembly, for example. The transparent roof portions can be selectively shaded or at least partially exposed by means of a roller blind assembly. To this end, the roller blind assembly comprises a roller blind unit for each transparent roof portion, said roller blind unit having a roller blind web which can be wound up into a roller blind coil on a winding shaft disposed at an edge of the respective transparent roof portion or unwound from the winding shaft in order to shade the respective transparent roof portion. Said roller blind web is provided with a guide tape on either side of a vertical longitudinal center plane of the roof, the guide tape being guided in a roof-attached guide rail disposed at the respective edge of the transparent roof portion in question. In this way, the parts of the roller blind web that are unwound from the winding shaft can be kept under tension in the transverse direction of the vehicle.

In currently known vehicle roofs of the kind mentioned above, the roller blind assembly is completely pre-installed on a roof before the latter is connected to a body shell of a vehicle. Since the needed installation space is no longer accessible, the roller blind assembly cannot be mounted after installation of the roof on the body shell. Additionally, installation of current roller blind assemblies of the kind described above requires high work precision when connecting web centering means to the guide rails. The process cannot be automated.

The object of the invention is to provide a vehicle roof of the kind mentioned above in which the roller blind assembly can also be mounted later, i.e. after the vehicle roof has been connected to a body shell, from below.

According to the invention, this object is attained by the vehicle roof having the features of claim 1.

SUMMARY

The vehicle roof according to the invention is characterized in that it comprises a roller blind assembly having a bearing shell on top of which the at least one roller blind unit is attached via lateral bearing elements and which is fixed to the at least one support portion from below. Thus, the roller blind assembly comprises, in the form of the bearing shell on which the roller blind unit is disposed or placed, a mounting platform which can be connected to the vehicle roof in the manner of a module even if the vehicle roof has already been fixed to the body shell. Thus, the roller blind assembly can be installed belatedly and automatedly in a modularized manner. This, in turn, allows the roller blind assembly to be tailored to the customer's wishes, such as in terms of the color of the roller blind web, at a later point. Additionally, the roller blind assembly can be moved toward the vehicle roof from below in an area of the vehicle roof that is located outside of the transparent roof portion. Thus, the roller blind assembly does not affect the available see-through portion of the roof. The bearing elements via which the roller blind unit is placed on the bearing shell serve to mount the roller blind coil, for example, and also for coupling the respective roller blind unit to roof-attached coupling rails and are in particular each formed by an injection-molded plastic part. The bearing shell is in particular made in one piece and extends in the transverse direction of the roof.

In a preferred embodiment of the vehicle roof according to the invention, the roller blind assembly is configured in such a manner that the roller blind unit can also be positioned relative to the bearing shell and to the support portion if the bearing shell is already fixed to the roof-attached support portion. This means that the roller blind unit is pre-positioned on the bearing shell, the bearing shell is attached to the support portion together with the pre-positioned roller blind unit and, subsequently, fine-positioning of the roller blind unit on the bearing shell can take place so that the roller blind unit moves into its precise mounting position at the vehicle roof.

Preferably, the roller blind assembly has at least one positioning aid for positioning the roller blind unit in relation to the bearing shell and to the support portion. For example, the positioning aid comprises a positioning slot which is formed for the lateral bearing elements on each of the bearing shells and which is engaged by a positioning element, in particular a positioning rib of the respective bearing element.

In order to be able to hold the bearing elements in the pre-positioned state on the bearing shell, each bearing element is preferably provided with at least one retaining element which penetrates an opening of the bearing shell and engages below the same. The retaining element is preferably made in one piece with the respective bearing element, which is in particular an injection-molded part.

In a specific embodiment of the vehicle roof according to the invention, the opening, which can be formed together with the positioning slot, has a widened insert portion, whose dimensions are larger than the cross-dimensions of the retaining element, and a tapered mounting portion, whose dimensions are smaller than those of a retaining portion of the respective retaining element. This means that during pre-installation of the bearing elements on the bearing shell, the bearing elements of the respective roller blind unit are placed via the insert portions and then shifted until the retaining portions of the retaining elements engage behind the bearing shell, whereby the roller blind unit is disposed on bearing shell in a manner substantially secured against falling off. For example, the retaining elements are each formed as a pin having an inversely T-shaped longitudinal section.

In order to be able to clamp the roller blind unit to the bearing shell in the pre-installation state, each bearing element preferably has at least one sliding element at its underside, said sliding element bearing on the bearing shell and in particular being resilient in the vertical direction of the roof.

In order to be able to define a pre-installation position of the roller blind unit on the bearing shell, each bearing element can have a catch which engages into a corresponding recess of the bearing shell when in the pre-installation position. When the bearing element is shifted relative to the bearing shell during pre-installation, the pre-installation position is achieved once the catch catches in the corresponding recess of the bearing shell.

In order to achieve a precise installation position in relation to the vertical and transverse directions of the roof during positioning on the vehicle roof, each bearing element can have at least one centering pin disposed at a front end and engaging into a roof-attached centering recess. The centering recess is formed in particular by a channel of a guide rail profile with which the front end of the respective bearing element is in contact when in the installation position. The front end thus forms a stop for the bearing element, whereby exact positioning of the roller blind unit is realized in the longitudinal direction of the roof, as well.

During mounting of the roller blind assembly on the support portion, it is advantageous if a pre-positioning of the bearing element relative to the support portion as precise as possible is achieved as soon as the roller blind assembly is being moved toward the support portion. This is achieved, for example, by the bearing elements each having a centering trough with two side walls between which a profile portion of a guide rail profile is received from above and between which a bearing element bottom is formed on which the profile portion rests when in the installation position. The side walls and the profile portion are preferably each provided with a lead-in chamfer. The lead-in chamfers prevent clamping prior to arrival in the end positon.

In a preferred embodiment of the vehicle roof according to the invention, the bearing elements are each realized as continuations of a guide rail profile. In this case, the bearing elements in particular each have a guide track for a pull bar slider, said guide track being aligned with a guide channel of the respective guide rail profile. Additionally, the bearing elements preferably each have a centering track in which a lateral guide tape of the roller blind web is guided and which is aligned with a channel of the guide rail profile. Thus, the complete roller blind unit can be pre-installed on the bearing shell and, once the latter has been installed on the support portion and once the bearing elements have been positioned, will merely have to be moved into a shading position by actuation of a pull bar.

Furthermore, the pull bar sliders preferably each have a coupling means for connecting a drive cable. For example, said coupling means is formed by a recess for a coupling element of the respective drive cable, which is driven by a drive motor. The recess can be open at the top and can accommodate the coupling element without play in the longitudinal direction of the respective guide rail profile. The recess can have lead-in chamfers for the respective coupling element.

The design of the recesses for the coupling element as described above allows the roller blind assembly including the roller blind web and including the pull bar to be installed on the roof-attached guide rail profiles from below, said guide rail profiles preferably forming the support portion of the vehicle roof according to the invention. When the roller blind assembly is moved toward the guide rail profiles, the correspondingly positioned coupling elements enter the recesses. Thus, direct coupling between the drive motor and the pull bar is established.

In the case of drive cables that are pre-installed on the roof-attached guide rail profiles, the coupling elements are preferably guided in the guide rail profiles in a manner secured against twisting, which means that they move into their installation position relative to the recesses of the pull bar sliders during installation of the roller blind assembly. In particular, the coupling elements comprise a tongue which points in the direction of the vertical longitudinal center plane of the roof. The tongues of the coupling elements thus each protrude in the direction of the vertical longitudinal center plane of the roof and merely have to be engaged with the pull bar sliders or the recesses when the roller blind assembly is moved toward them.

Preferably, the bearing elements are used not only for web centering, i.e. to center the roller blind web in the transverse direction of the roof, but also to mount the roller blind coil. In particular, the bearing elements can each comprise a bearing pin for a winding tube, in particular for a winding shaft pre-loaded by means of a winding spring. However, the roller blind unit can also be realized without a winding tube. In this case, the lateral guide tapes are preferably each realized as a constant force spring which causes the roller blind webs to be wound up outside of the guide rails.

In order to increase the stiffness of the respective vehicle in the roof area, the bearing shell can be provided with a fixing plate on either side of the vertical longitudinal center plane of the roof via which it can be fixed to the vehicle body. For example, the fixing plates are connected to the B-pillars of the vehicle when in the mounted state.

Additionally, it is advantageous if the bearing shell is screwed to the guide rail profiles from below when in the installation position. A high positional stability is also achieved if the bearing elements of the roller blind unit are screwed to the guide rail profiles from below as well.

In a vehicle roof with two transparent roof portions, the roller blind assembly can comprise two roller blind units which are disposed on the bearing shell and which can be extended in opposite directions.

The bearing shell can form a running edge for the roller blind web and thus predefine a curvature of the extended portion of the roller blind web.

The support portion to which the roller blind assembly or the bearing shell of the roller blind assembly is fixed in the installation position can be formed by a frame of a roof opening system. The roof opening system can have lateral guide rails or guide rail profiles on which the roller blind web is guided via lateral guide tapes.

Other advantages and advantageous embodiments of the subject-matter of the invention are apparent from the description, the drawing and the claims.

BRIEF DESCRIPTIONS OF THE DRAWINGS

An embodiment of a vehicle roof according to the invention is illustrated in a schematically simplified manner in the drawing and will be explained in more detail in the following description.

FIG. 17 shows the roller blind assembly with two pre-installed roller blind units;

FIG. 18 shows a bearing element of a roller blind unit in a perspective illustration;

FIG. 19 shows a bottom view of the bearing element of FIG. 18;

FIG. 20 shows a side view of the vehicle roof during installation of the roller blind assembly;

DETAILED DESCRIPTION

Figure 1:
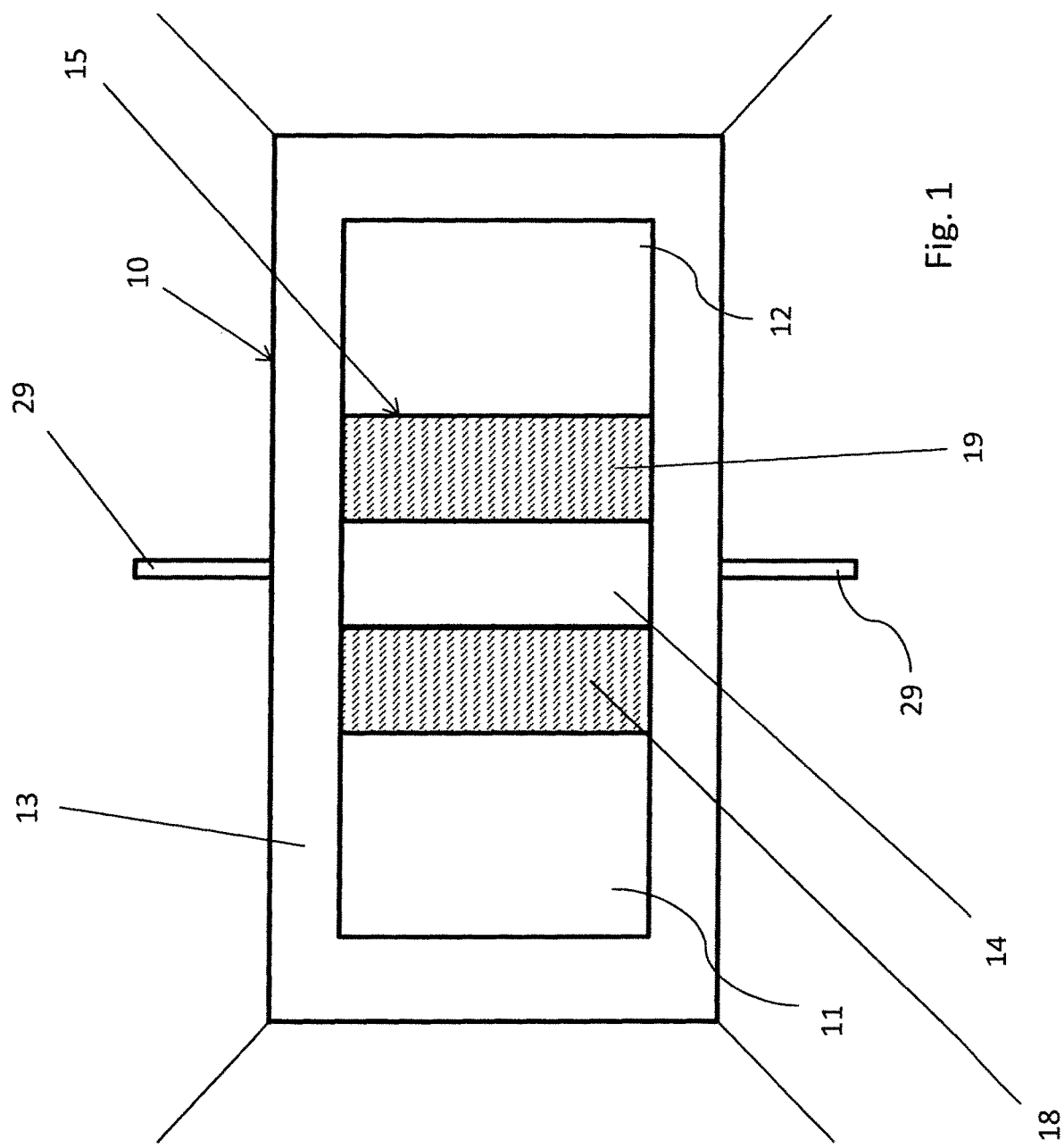
FIG. 1 shows a top view of a vehicle roof according to the invention.
Figure 2:
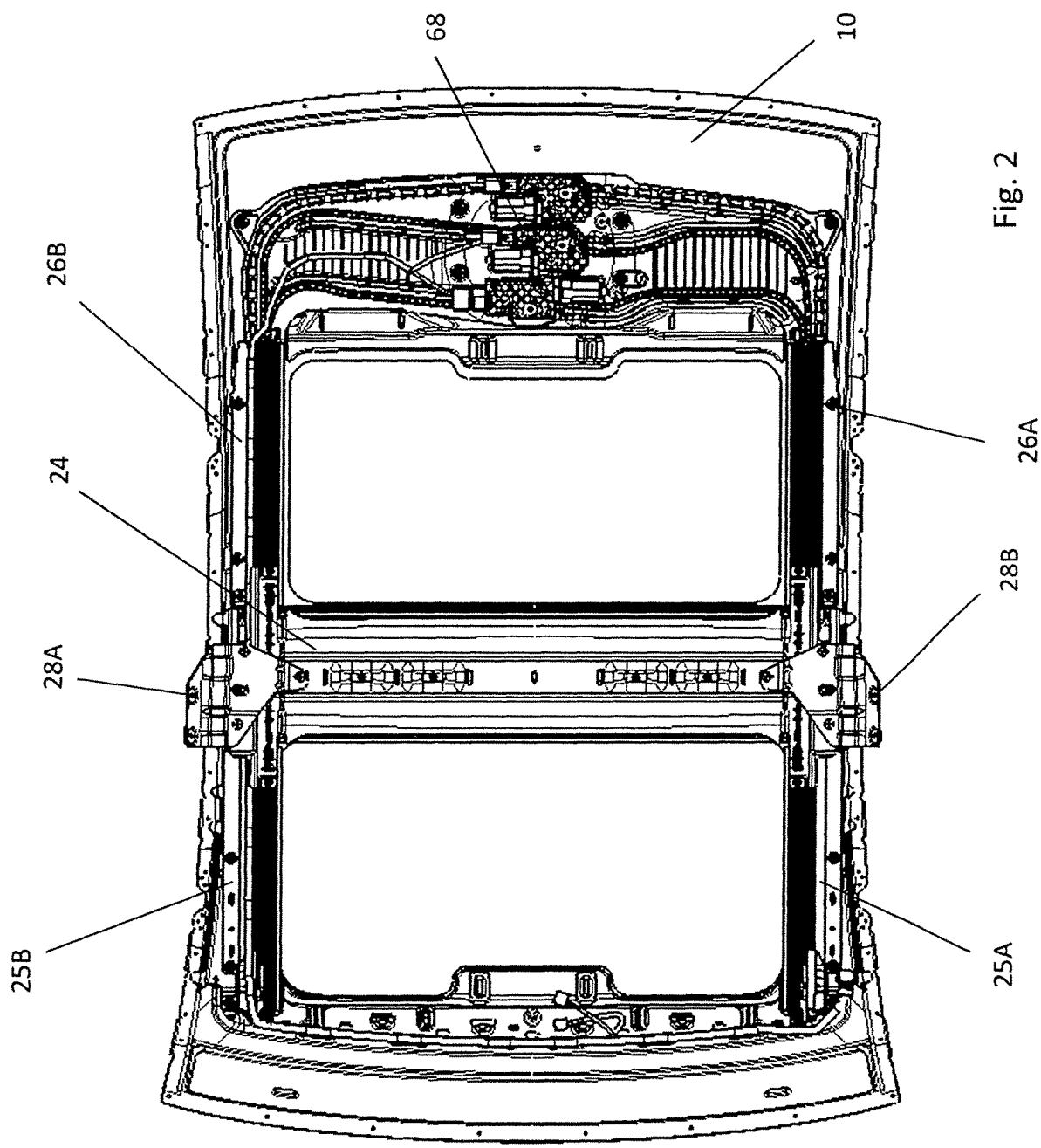
FIG. 2 shows a bottom view of the vehicle roof.
Figure 3:
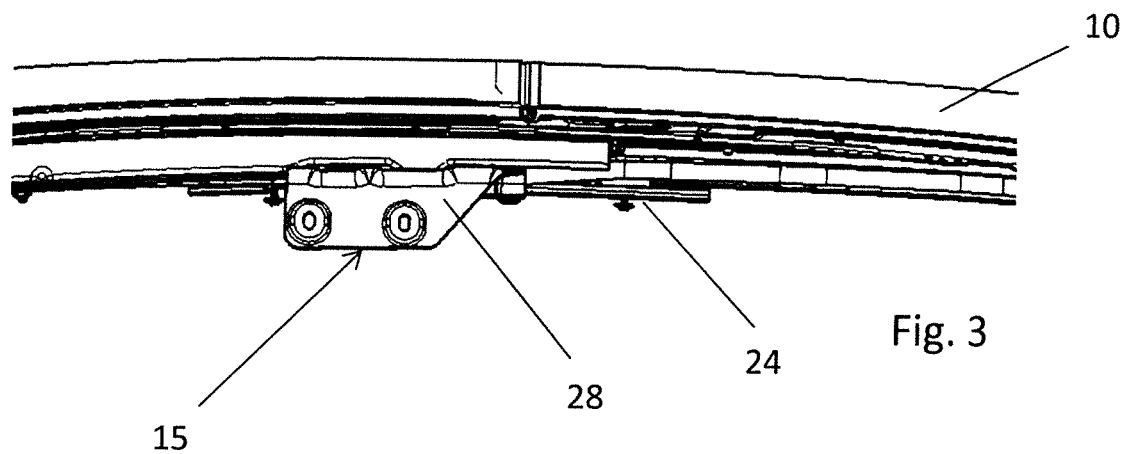
FIG. 3 shows a side view of a part of the vehicle roof.
Figure 4:
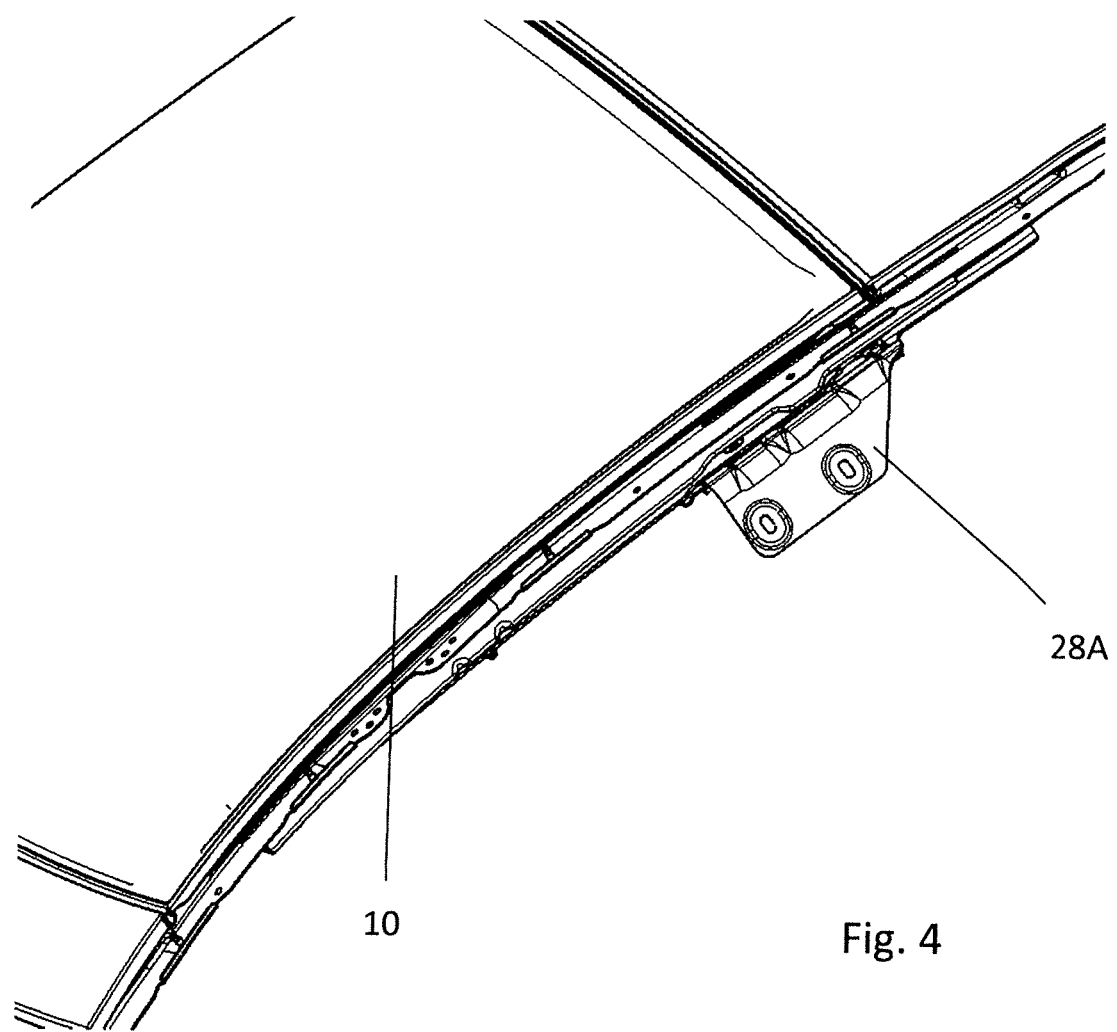
FIG. 4 shows a perspective top view of a part of the vehicle roof.

The drawing illustrates a vehicle roof 10 which is a panoramic roof of a passenger vehicle and which has a front transparent roof portion 11 and a rear transparent roof portion 12. Front transparent roof portion 11 is formed by a displaceable lid element of a sunroof system. Transparent roof portions 11 and 12 are framed by an opaque solid roof portion 13 and separated from each other by a web-like solid roof portion 14 extending in the transverse direction of the vehicle.

For selectively shading or at least partially exposing transparent roof portions 11 and 12, vehicle roof 10 has a roller blind assembly 15 which comprises two roller blind units 16 and 17, of which roller blind unit 16 is assigned to front transparent roof portion 11 and roller blind unit 17 is assigned to rear transparent roof portion 12. Roller blind unit 16 has a roller blind web 18 for shading front transparent roof portion 11. Roller blind unit 17 has a roller blind web 19 for shading rear transparent roof portion 12. Roller blind webs 18 and 19 are each formed by an opaque fabric capable of being wound and can be wound up into a roller blind coil 20 and 21, respectively, in the area disposed below solid roof portion 14. To actuate roller blind webs 18 and 19, i.e. to extend them or wind them up, roller blind units 16 and 17 each have a pull bar 22 and 23, respectively, which is disposed at the edge facing away from roller blind coil 20 and 21, respectively, on the respective roller blind web 18 and 19, respectively.

In the case at hand, roller blind units 16 and 17 are of identical design, which is why part of the following description will be based on roller blind unit 16 only, which is assigned to front transparent roof portion 11.

Roller blind assembly 15 comprises a bearing shell 24 which is screwed to a pair of front guide rails or guide rail profiles 25A and 25B, which are disposed along the lateral edges of front transparent roof portion 11, and to a pair of rear guide rails or guide rail profiles 26A and 26B, which are disposed along the lateral edges of rear transparent roof portion 12, from below by means of fixing screws 27 and forms a support plate for roller blind units 16 and 17. Additionally, bearing shell 24 is provided with fixing plates 28A and 28B at its edges disposed on either side of a vertical longitudinal center plane of the roof; fixing plates 28A and 28B can each be screwed to a respective B-pillar 29 of the vehicle body in question. Guide rails 25A, 25B, 26A and 26B form the support portion for bearing shell 24. Bearing shell 24 forms running edges for roller blind webs 18 and 19 at its edges extending in the transverse direction of the roof.

Roller blind units 16 and 17 each comprise bearing elements 30 which are mirror-symmetrical to each other with respect to the vertical longitudinal center plane of the roof and via which roller blind units 16 or 17 are installed on the bearing shells 24. Additionally, roller blind units 16 and 17 each have a winding shaft 31 which is mounted rotatably between respective bearing elements 30 of a roller blind unit and which has a winding tube pre-loaded in the respective winding direction of roller blind webs 18 and 19 by a winding spring (not shown). For mounting winding shaft 31, bearing elements 30 each have a bearing pin 32.

Figure 6:
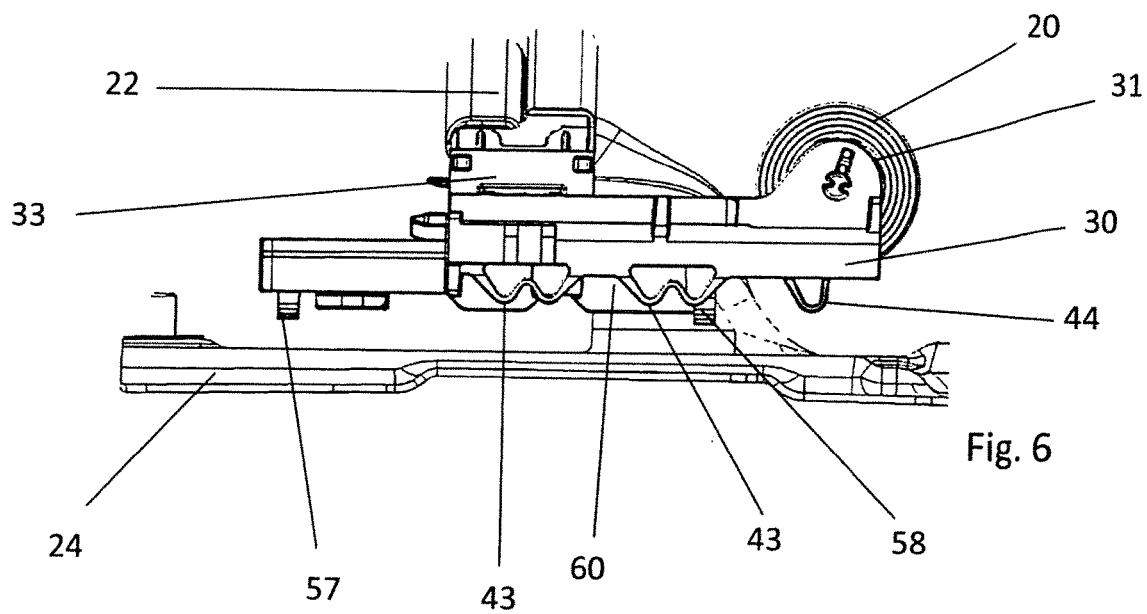
FIGS. 6 to 8 show a pre-installation of a roller blind unit of the roller blind assembly in a side view.
Figure 7:
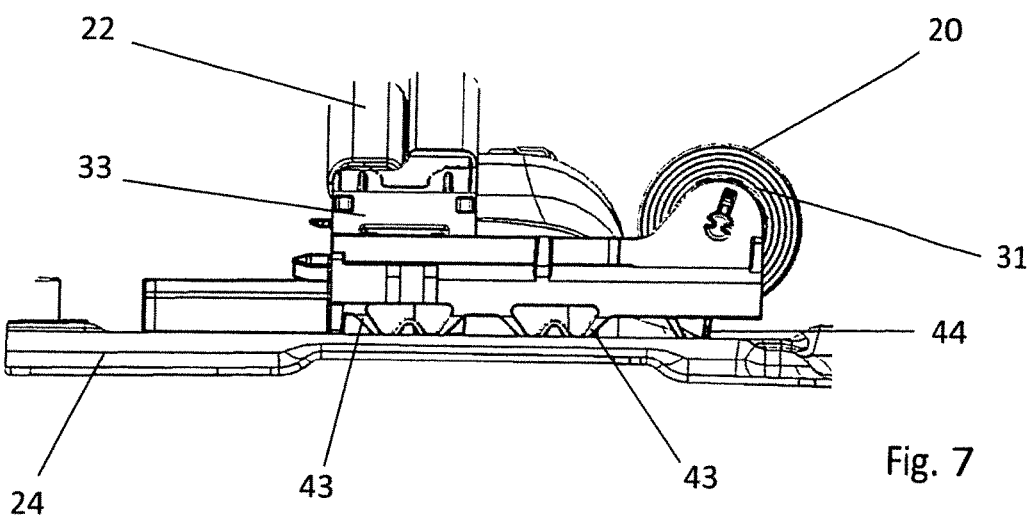
Figure 9:
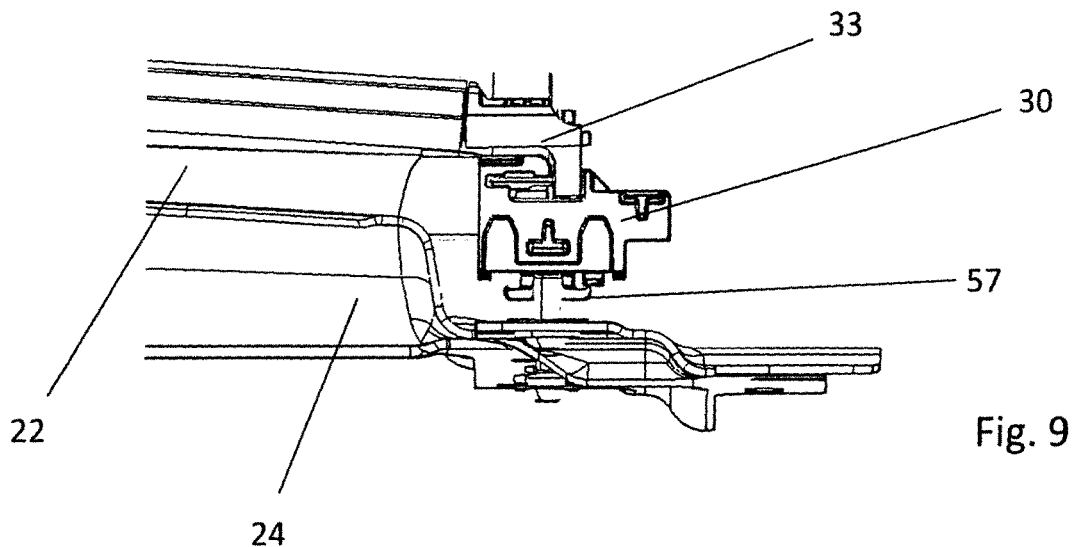
FIGS. 9 to 11 show the pre-installation in a front view.
Figure 10:
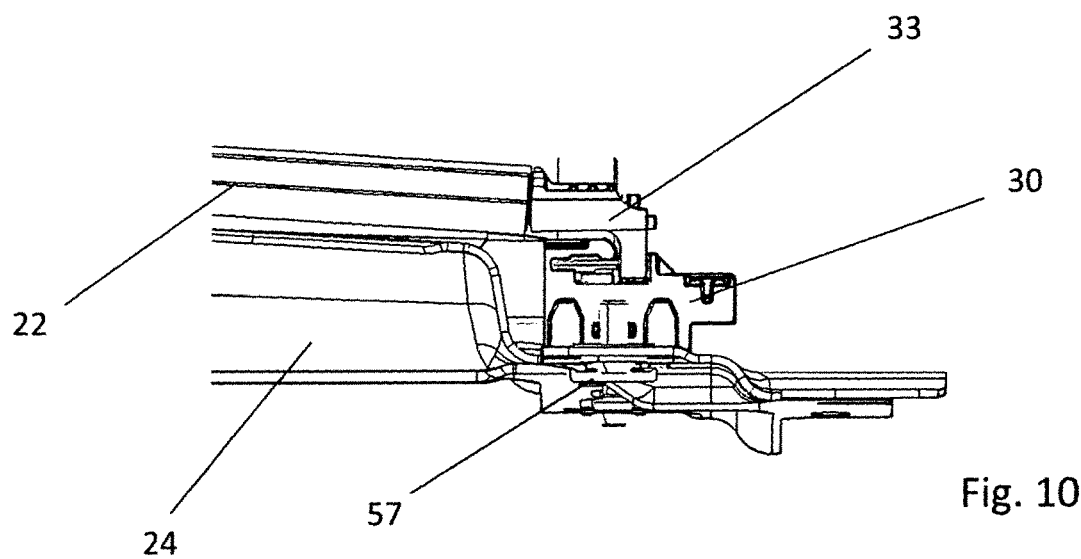

Furthermore, roller blind units 16 and 17 comprise pull bars 22 and 23, respectively, each of which is provided with a pull bar slider 33 at each of its ends. Pull bar sliders 33 are guided in guide rails 25A and 25B and 26A and 26B, respectively, and are disposed in a guide track 34 of respective bearing element 30 when in the pre-installation position, which is illustrated in FIGS. 6 and 9, for example; each guide track 34 is aligned with a respective guide channel 35 of guide rails 25A, 25B, 26A and 26B. In order to secure the pre-installation position of pull bar sliders 33 in guide tracks 34 of bearing elements 30, the latter each have a catch depression 36 on the outer boundary wall of guide track 34, a spring element 37 of respective guide bar slider 33 engaging into said catch depression 36.

Bearing elements 30, which are injection-molded plastic parts, additionally have a centering track 38 in which a respective lateral guide tape 39 of roller blind web 18 is guided, said lateral guide tape 39 being formed by a metal tape or a plastic tape and connected to a connection tab 331 of respective pull bar slider 33, said connection tab 331 also engaging into centering track 38. Each centering track 38 is aligned with a respective channel 40 of guide rails 25A, 25B, 26A and 26B.

Bearing elements 30 of each roller blind unit 16 and 17, respectively, are mirror-symmetrical to each other. As shown in FIGS. 18 and 19, bearing elements 30 each comprise a base body 41 which has a rear protrusion 42 from which respective bearing pin 32 for mounting roller blind coils 20 and 21 protrudes inward in the direction of the vertical longitudinal center plane of the roof, i.e. in the transverse direction of the roof. In base body 41, guide track 34 for respective pull bar slider 33 and centering track 38 for roller blind web 19 are formed.

Figure 8:
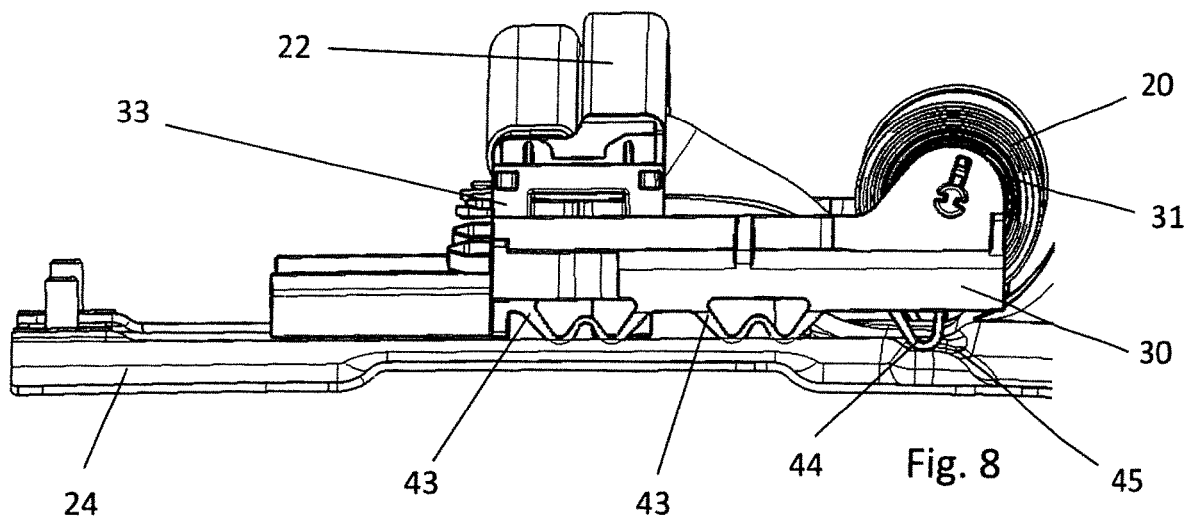

At each of the lateral edges, base body 41 has two sliding elements 43 on the underside which are resilient in the vertical direction of the roof and via which bearing element 30 bears on bearing shell 24. Additionally, a catch 44 is disposed on the underside of base body 41, said catch 44 engaging into a recess or groove 45 of bearing shell 24 when in the pre-installation position, which is illustrated FIG. 8, for example, thus defining a pre-installation position of bearing element 30 on bearing shell 24 (cf. FIG. 8).

At the front end, i.e. at the end facing away from bearing pin 32, a centering trough 46 extending in the longitudinal direction of the roof is disposed on base body 41, said centering trough 46 having two side walls 47 which are connected to each other via a trough bottom 48. Side walls 47 each have a lead-in chamfer 49 at their upper side. A mounting hole 50 for a positioning screw 51 is formed at trough bottom 48. Mounting hole 50 is an oblong hole, which is why positioning screw 51 has play in the longitudinal direction of the roof in mounting hole 50.

By means of positioning screw 51, bearing element 30 is screwed to respective guide rail 25A, 25B, 26A or 26B and to bearing shell 24.

As can be seen in FIGS. 21 to 24, side walls 47 of centering trough 46 interact with downward-projecting webs 52 of respective guide rail 25A, 25B, 26A or 26B in such a manner that they penetrate the space between side walls 47 from above in an at least largely form-fitting fashion and bear on trough bottom 48. Webs 52, which constitute a profile portion of respective guide rail 25A, 25B, 26A or 26B, also have a lead-in chamfer 521 at each of their front ends, which interacts with respective lead-in chamfer 49 of respective side wall 47 of centering trough 46. Centering trough 46 allows exact pre-positioning of bearing elements 30 on guide rails 25A, 25B, 26A and 26B to be achieved in the vertical direction of the roof and in the transverse direction of the roof.

At the end facing away from bearing pin 32, bearing elements 30 have three centering pins 53, 54 and 55 which, when in the installation position (FIGS. 29, 32, 35 and 38), engage into corresponding channels or centering recesses of guide rails 25A and 25B. In the top view, entering pin 53 and 54 each have a T-shaped outline and alternatively an L-shaped outline, which can correspond to the outline of the respective guide rail channel. In order to be able to easily introduce centering pins 53 to 55 into the guide rail channels during installation, they are also provided with lead-in chamfers. An end face 56 of base body 41 at which centering pins 53 to 57 are formed constitutes a stop surface via which respective bearing element 30 is in contact with respective guide rail 25A, 25B, 26A or 26B when in the installation position. End face 56 thus defines the position of bearing element 30 relative to guide rails 25A and 25B in the longitudinal direction of the roof. The position in the transverse direction of the roof and in the vertical direction of the roof is defined by centering pins 53 to 55.

At the underside of each bearing element 30, two retaining elements 57 and 58 are formed, each retaining element 57 and 58 being formed by a pin which has an approximately inverted T-shaped longitudinal section and engaging into a slot-shaped opening 59 of bearing shell 24. Retaining elements 57 hold bearing element 30 on bearing shell 24 in cooperation with resilient sliding elements 43.

At their underside, bearing elements 30 additionally each have a positioning rib 60 which extends in the longitudinal direction of the roof and which engages into a positioning slot 61 of bearing shell 24. Positioning slot 61 is part of opening 59, which is penetrated by retaining elements 57 and 58.

Opening 59 has two insert portions 62 and 63 which each have a substantially rectangular outline and whose dimensions are slightly larger than the cross-dimensions of a retaining portion 64 of retaining elements 57 and 58. Insert portion 62 ends in a tapered mounting portion 65 in whose area retaining element 57 is disposed when in the final installation position, allowing retaining portion 64 to engage behind the plate of bearing shell 24 (cf. FIG. 32).

Figure 31:
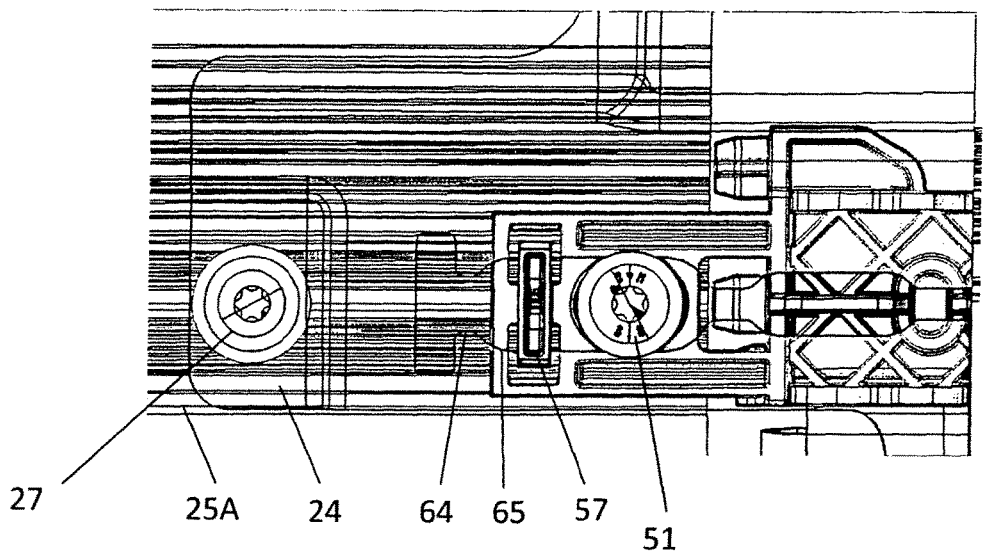
FIGS. 31 to 33 show bottom views for different positions during final positioning of the roller blind unit.
Figure 32:
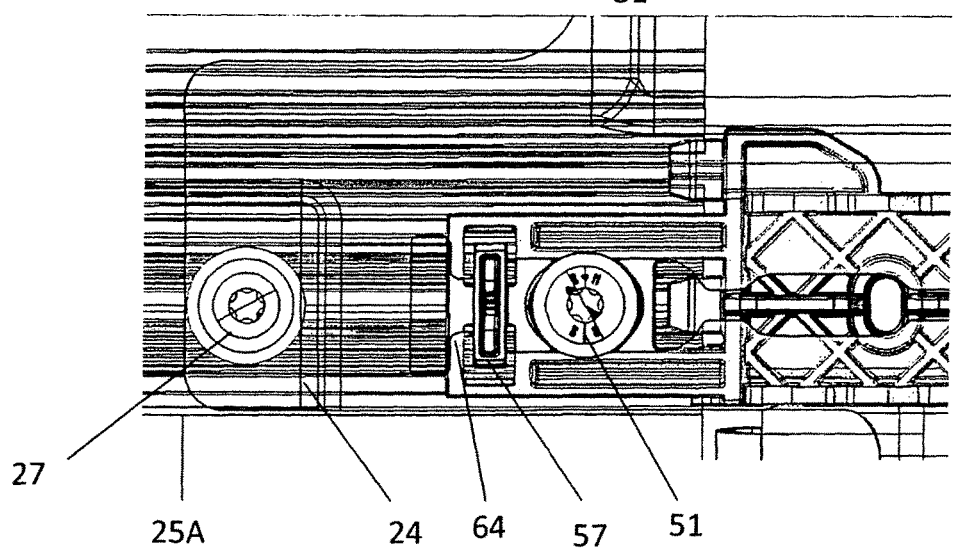
Figure 33:
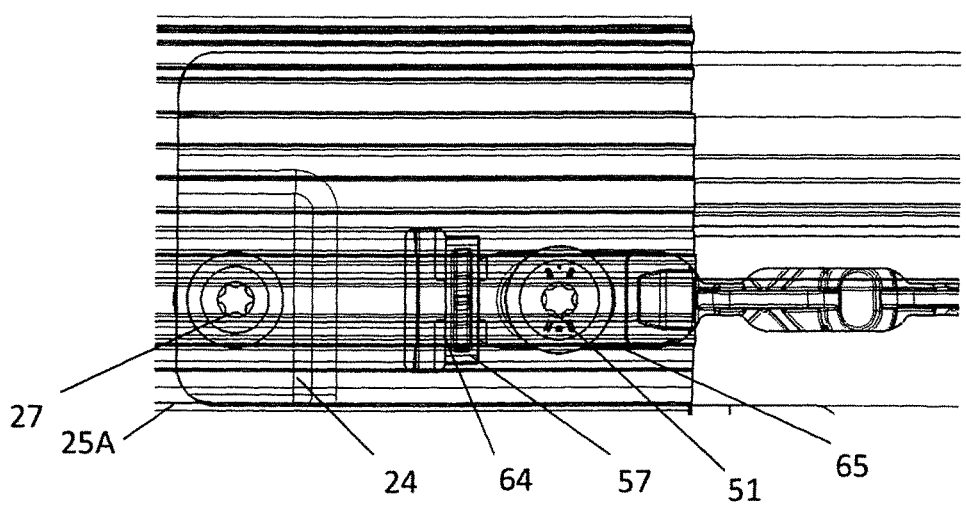
Figure 34:
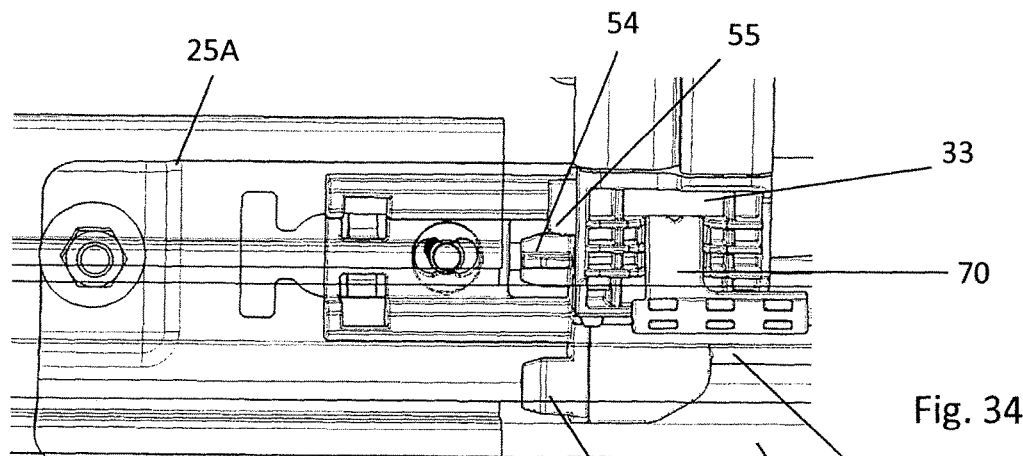
FIGS. 34 to 36 show side views for different positions during final positioning of the roller blind unit.
Figure 35:
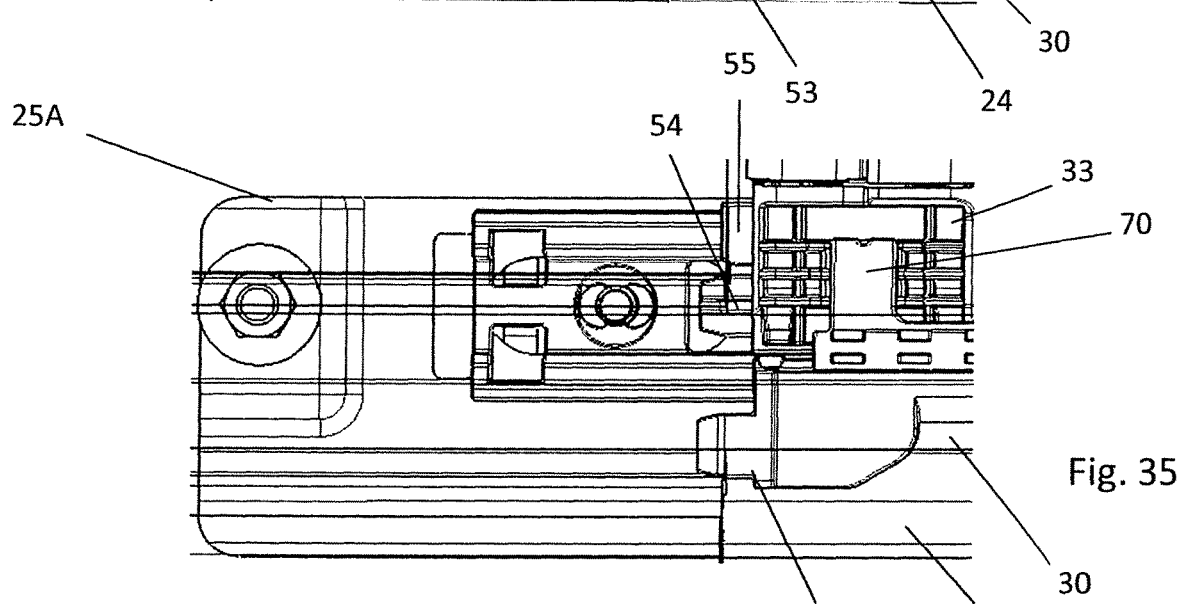
Figure 36:
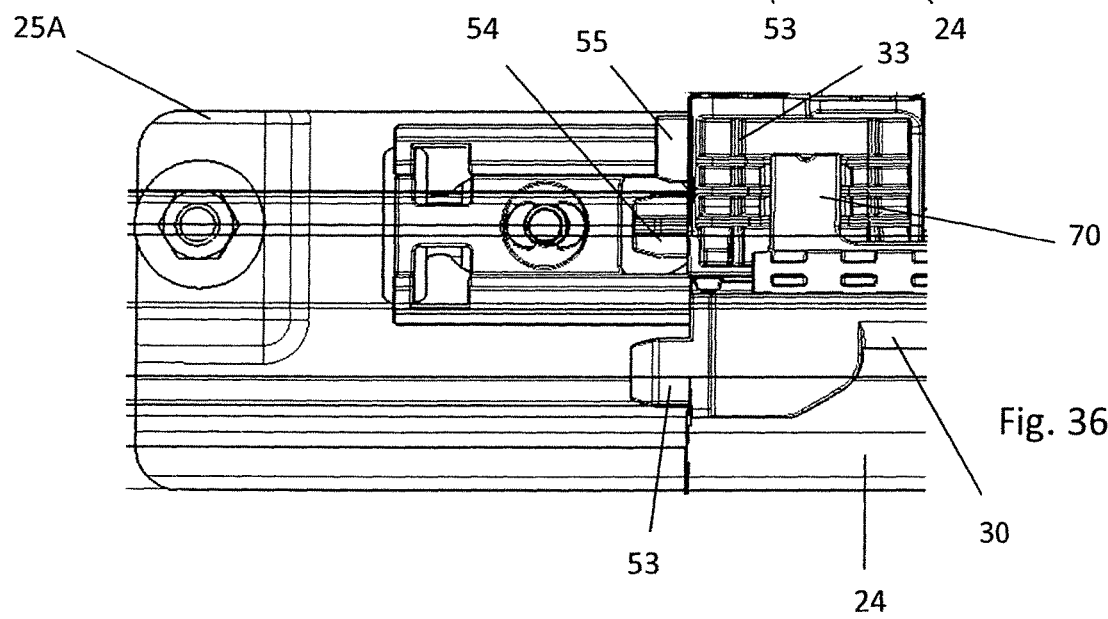
Figure 37:
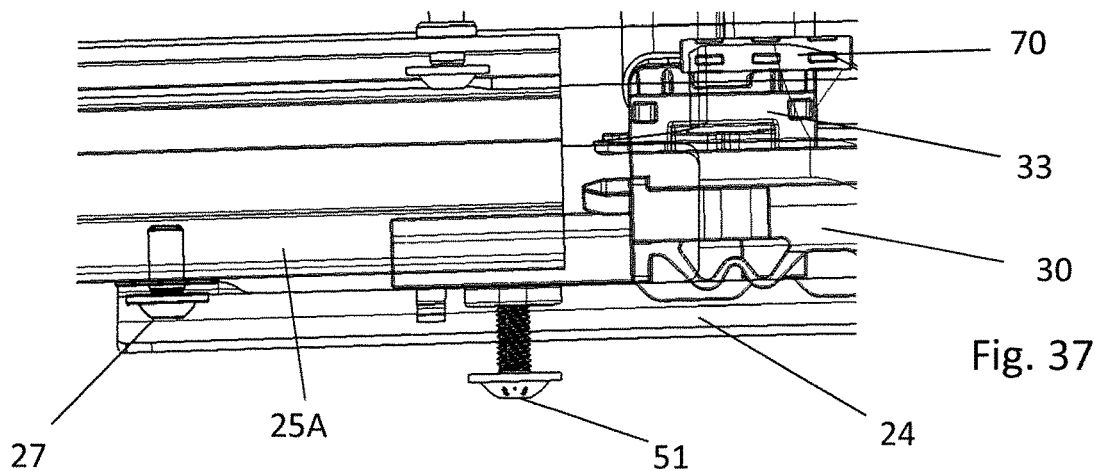
FIGS. 37 to 39 show top views for different positions during final positioning of the roller blind unit.
Figure 38:
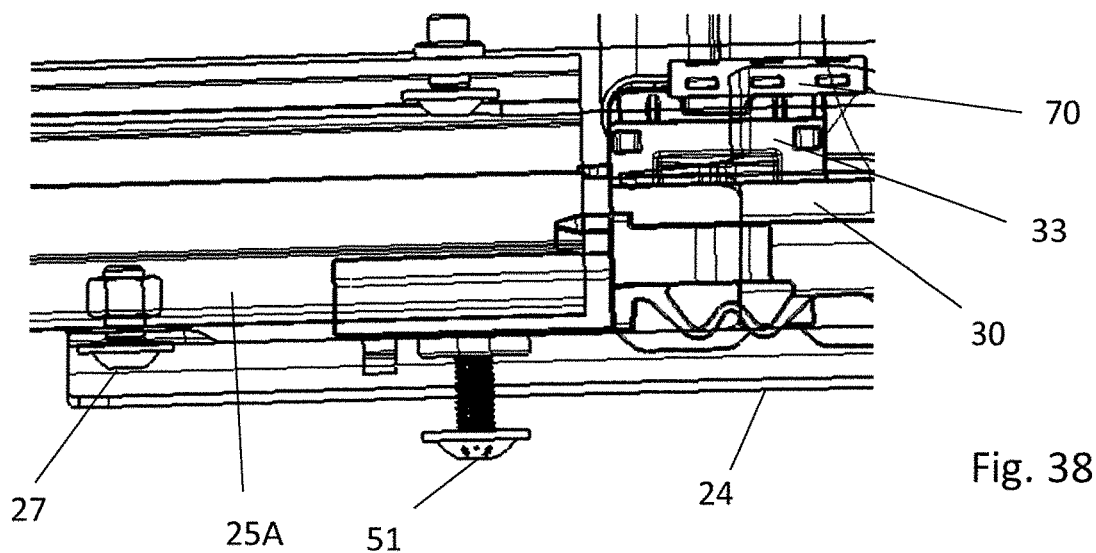
Figure 39:
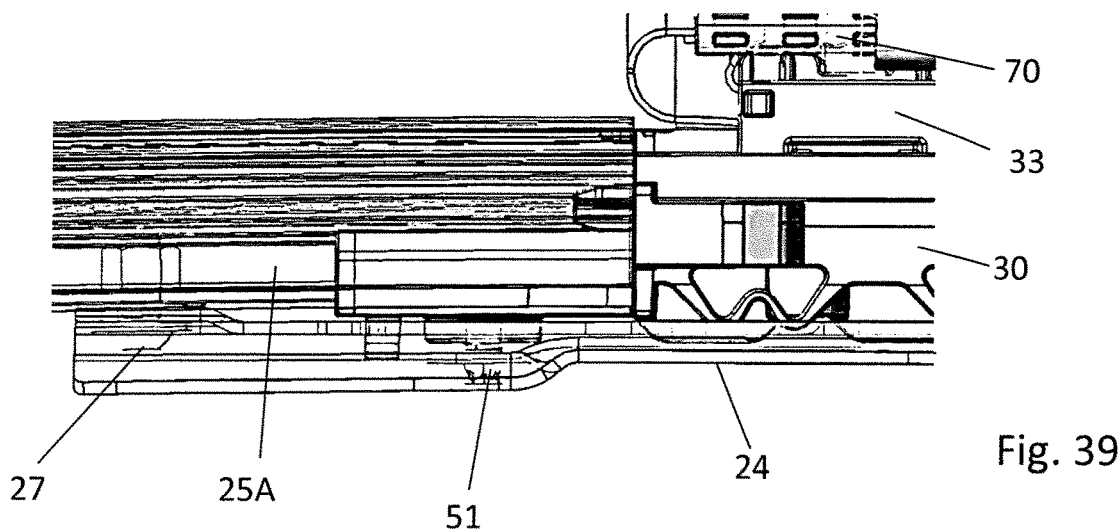

Tapered portion 65, in turn, ends in a widened portion 66 in whose area mounting hole 50 for positioning screw 51 is disposed. Widened portion 66 is narrower than insert portion 62, allowing retaining portion 64 of retaining element 57 to engage behind the plate of bearing shell 24 in the area of widened portion 66 as well (cf. FIG. 31). Widened portion 59 ends in positioning slot 61, which, in turn, ends in insert portion 63 for retaining element 58. Another slot portion 67 is adjacent to insert portion 63.

For being driven, roller blind assembly 15 has an electric motor 68 which drives compression-resistant drive cables 69 whose ends are each provided with a coupling element 70 which is formed in the manner of a tab or tongue and which protrudes in the direction of the vertical longitudinal center plane of the roof. For connection to drive cables 69, pull bar sliders 33 each have a recess 71 at their upper sides, in which tab-like coupling element 70 of respective drive cable 69 is disposed without play in the direction of displacement of pull bar 22. Recess 71 has lead-in chamfers 72 along which coupling element 70 is moved into position when roller blind assembly 15 is being installed on guide rails 25A, 25B, 26A and 26B, which constitute a roof-attached support portion.

Installation of roller blind assembly 15 takes place with the vehicle roof 10 installed on the vehicle body, namely in the manner described below.

Figure 5:
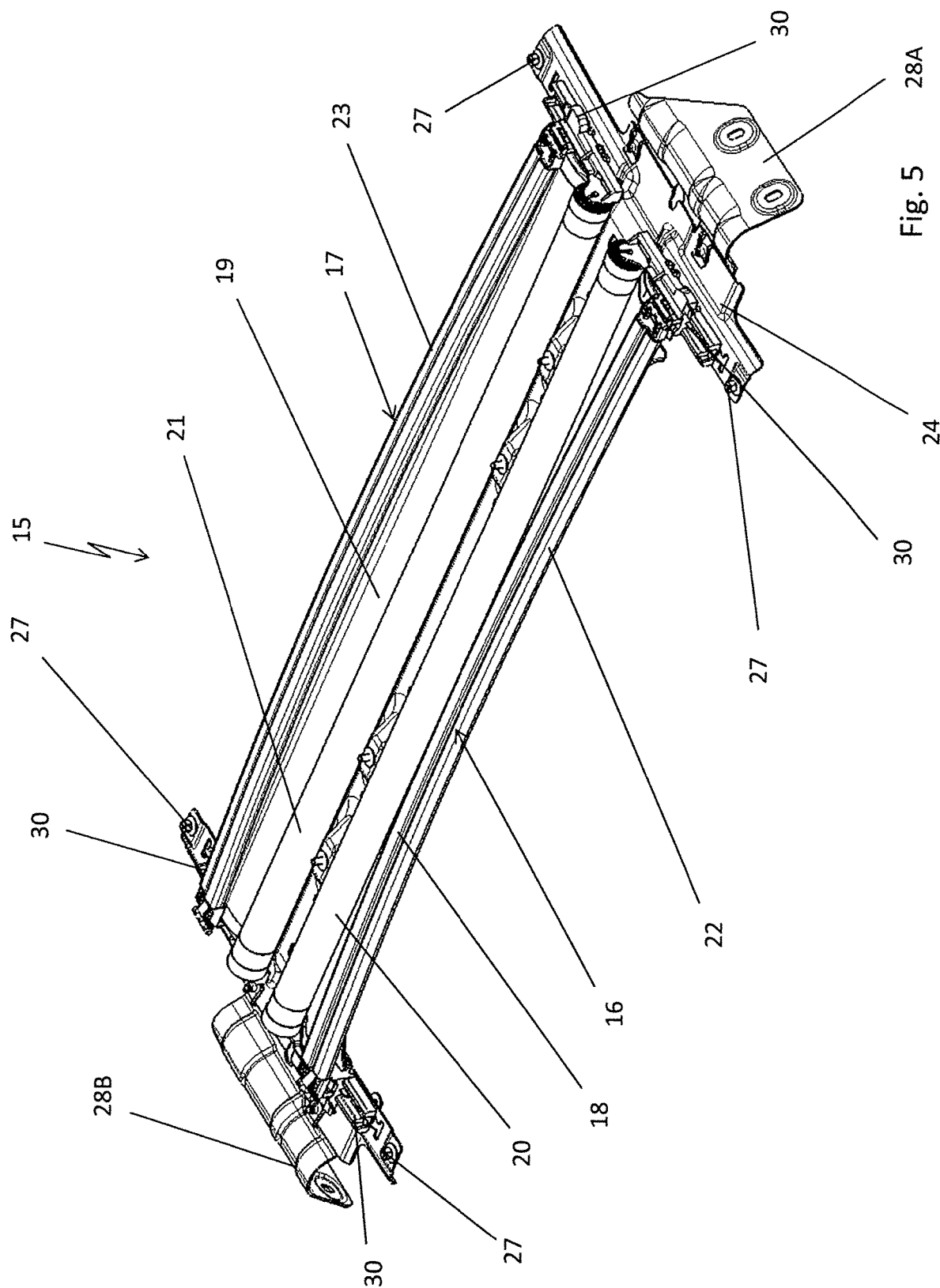
FIG. 5 shows a roller blind assembly of the vehicle roof.
Figure 11:
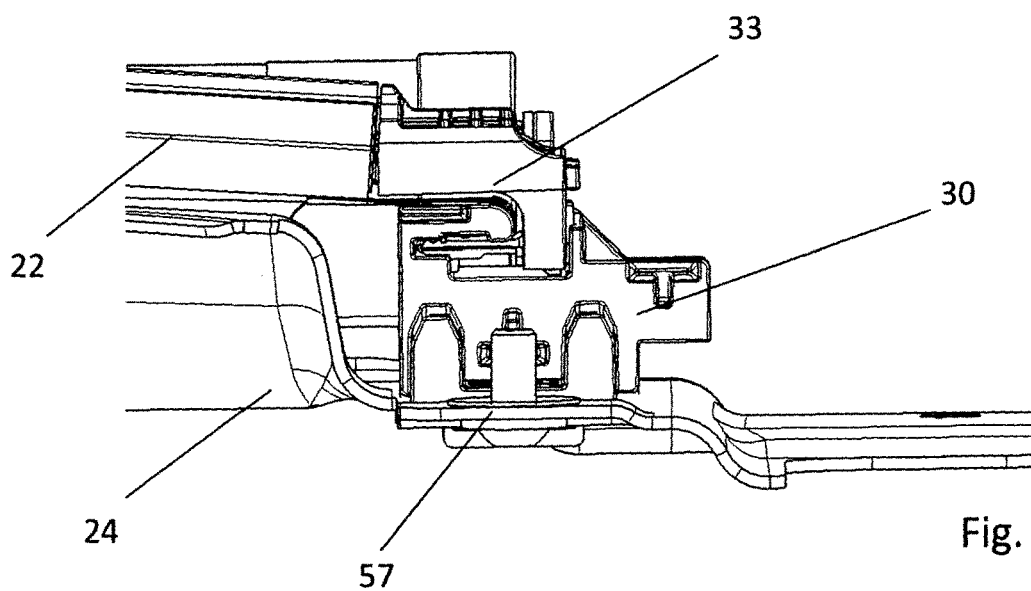
Figure 12:
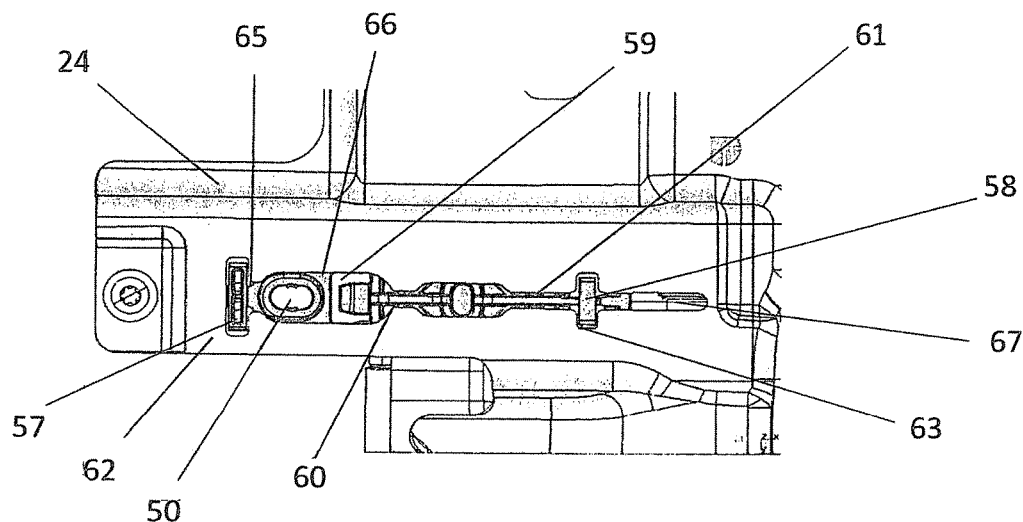
FIGS. 12 to 14 show the pre-installation in a bottom view.
Figure 13:
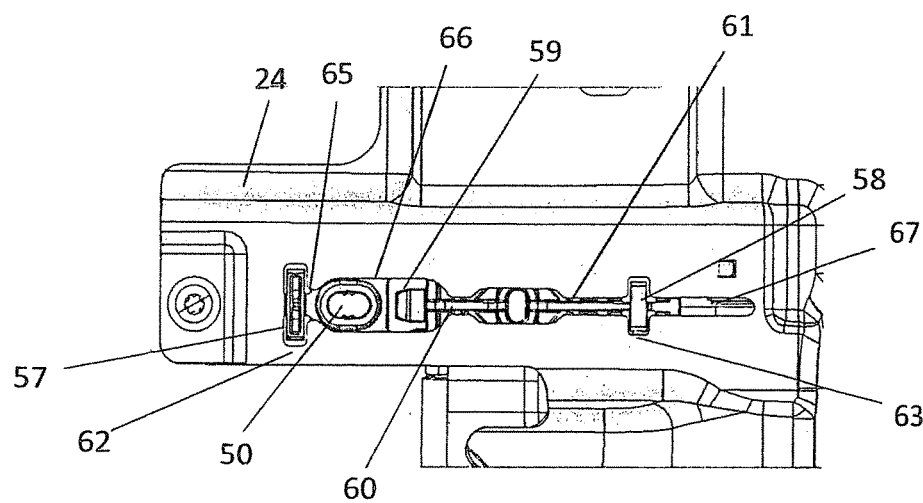
Figure 14:
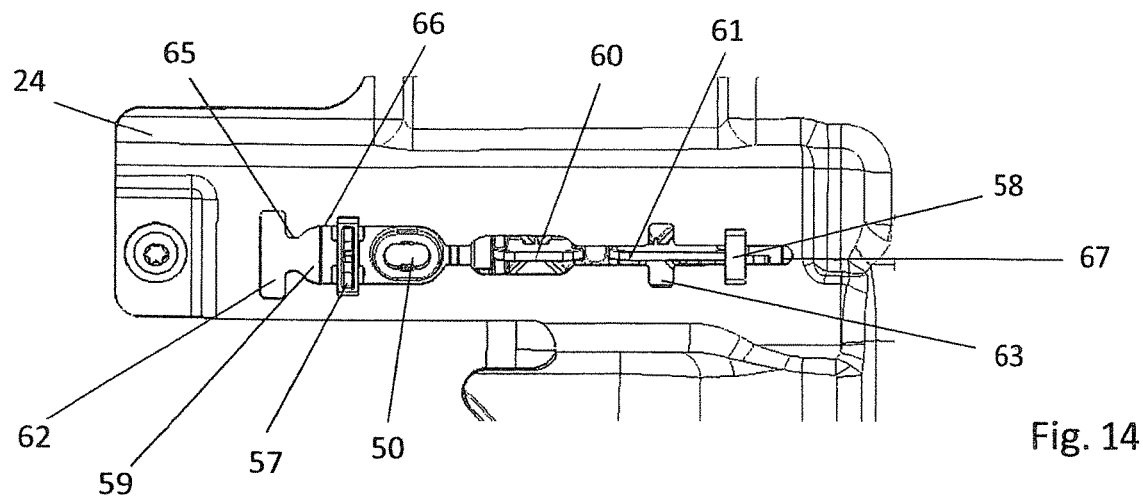
Figure 15:
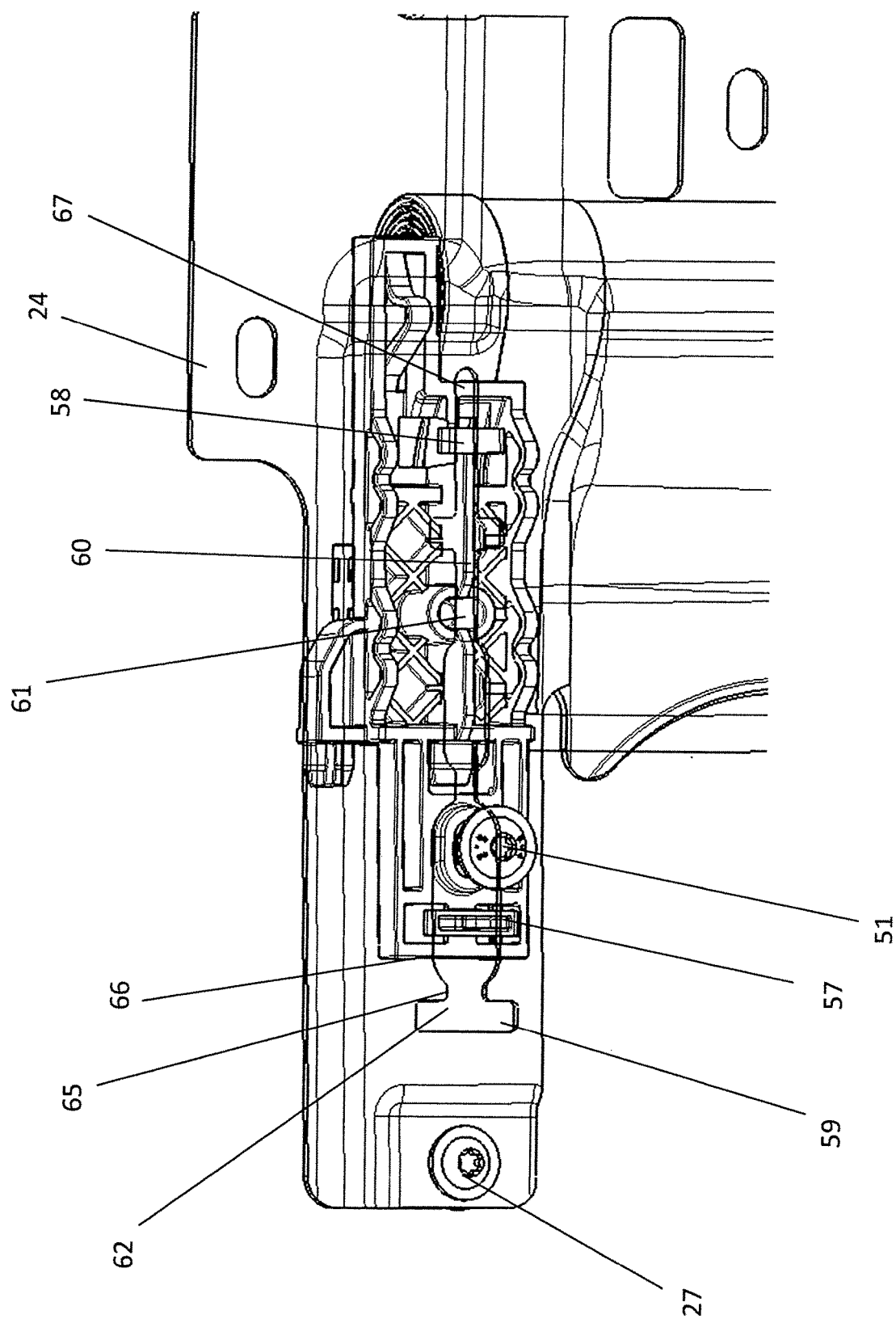
FIG. 15 shows a perspective bottom view of the roller blind assembly in the pre-installation state.
Figure 16:
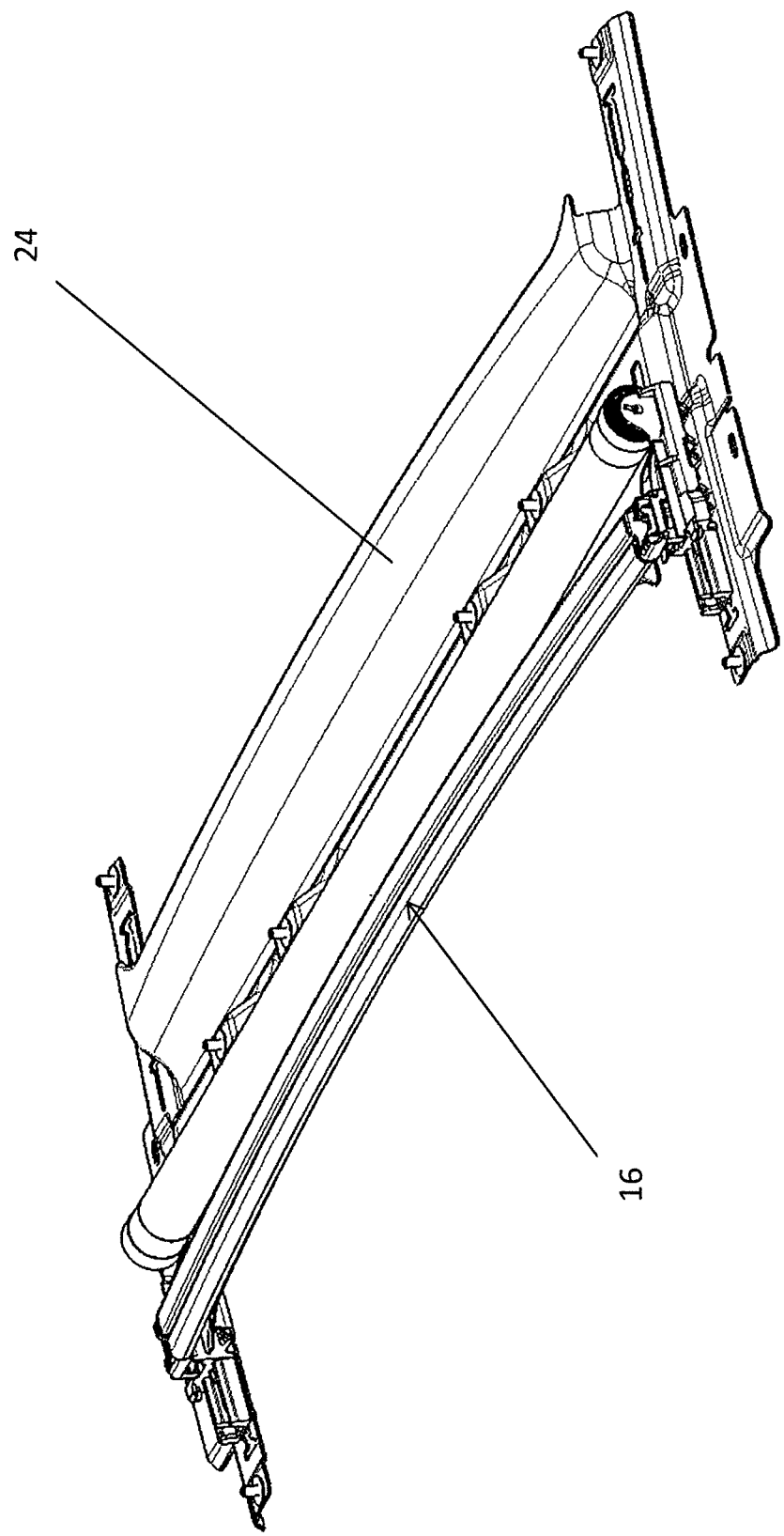
FIG. 16 shows the roller blind assembly with a pre-installed roller blind unit.
Figure 21:
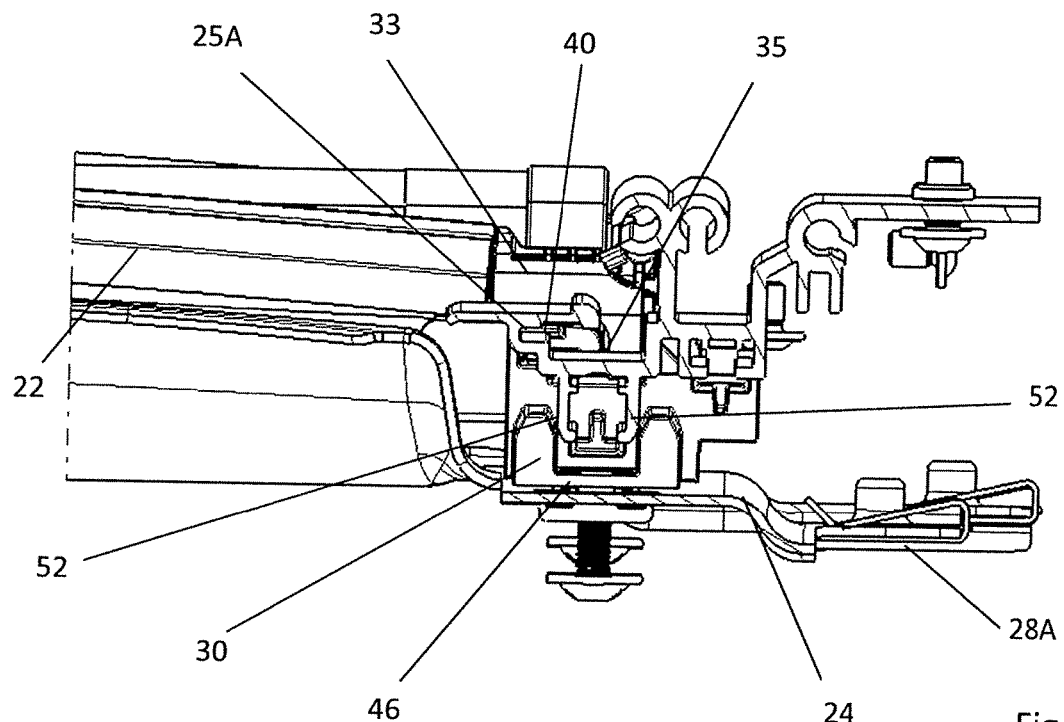
FIGS. 21 and 22 show a section through the vehicle roof for two states during connection of the roller blind assembly to the vehicle roof.
Figure 22:
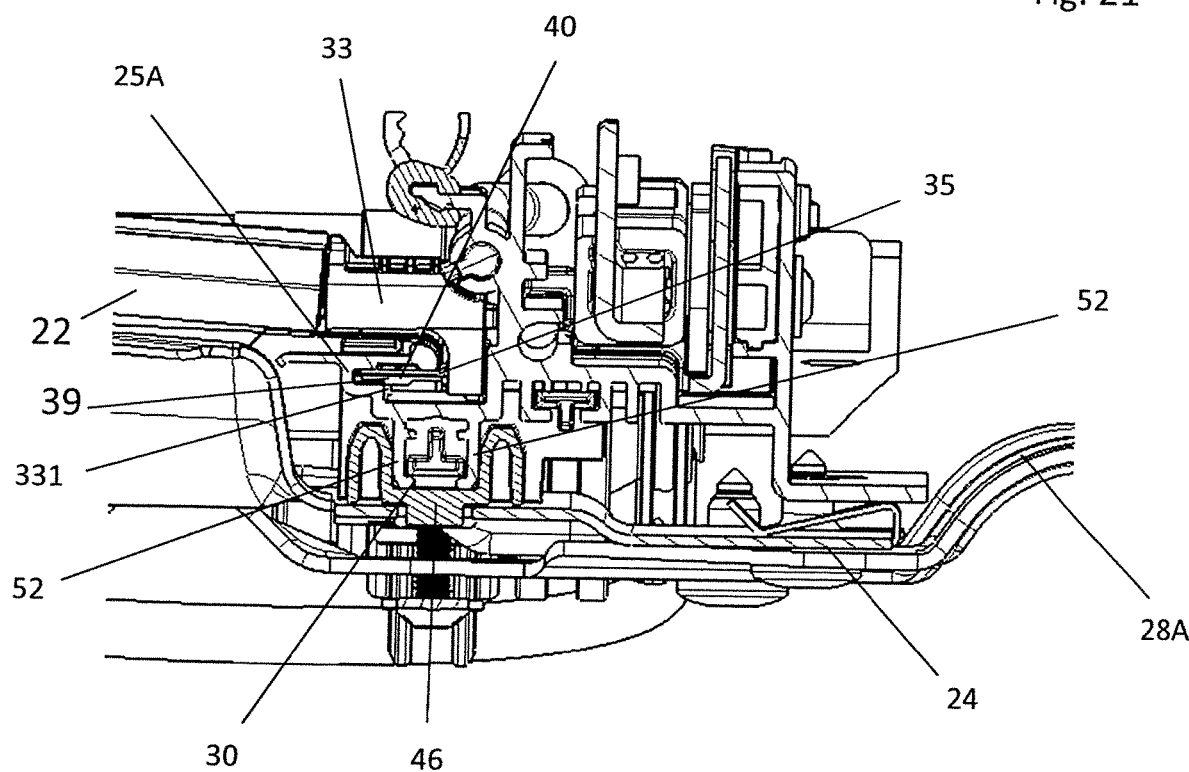
Figure 23:
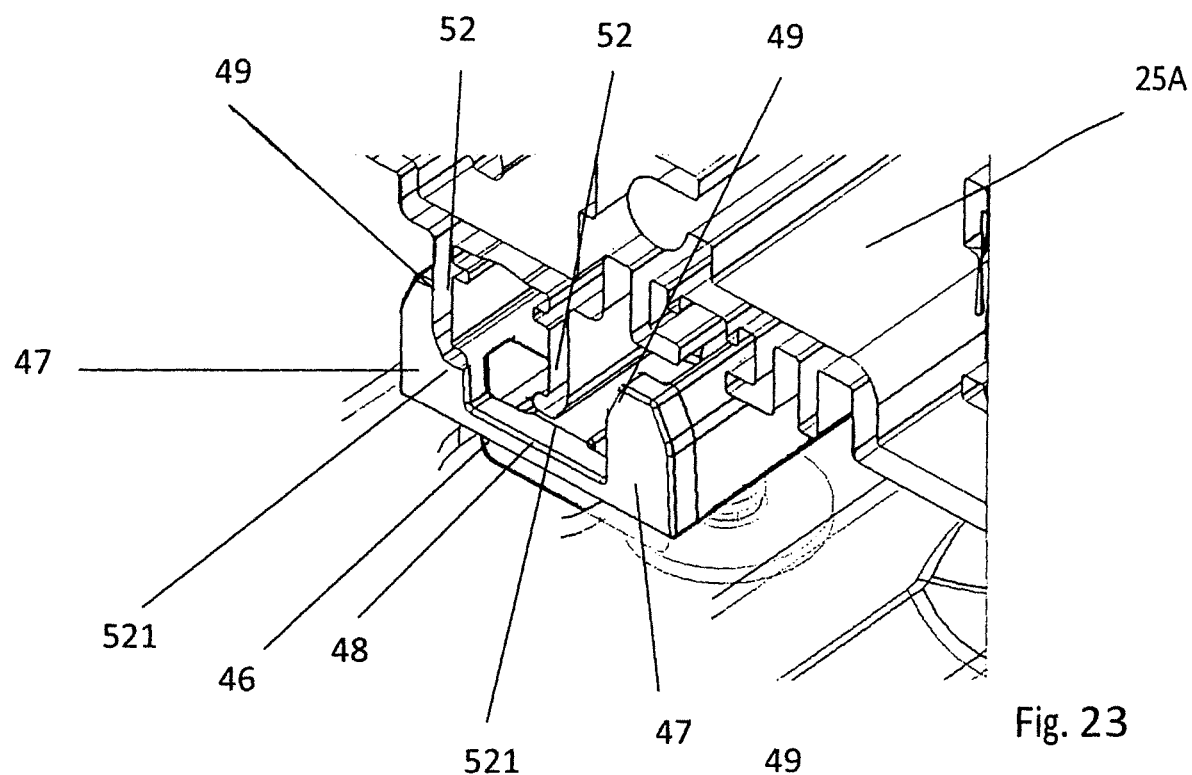
FIGS. 23 and 24 show the two states of FIGS. 21 and 22, but in a perspective section.
Figure 24:
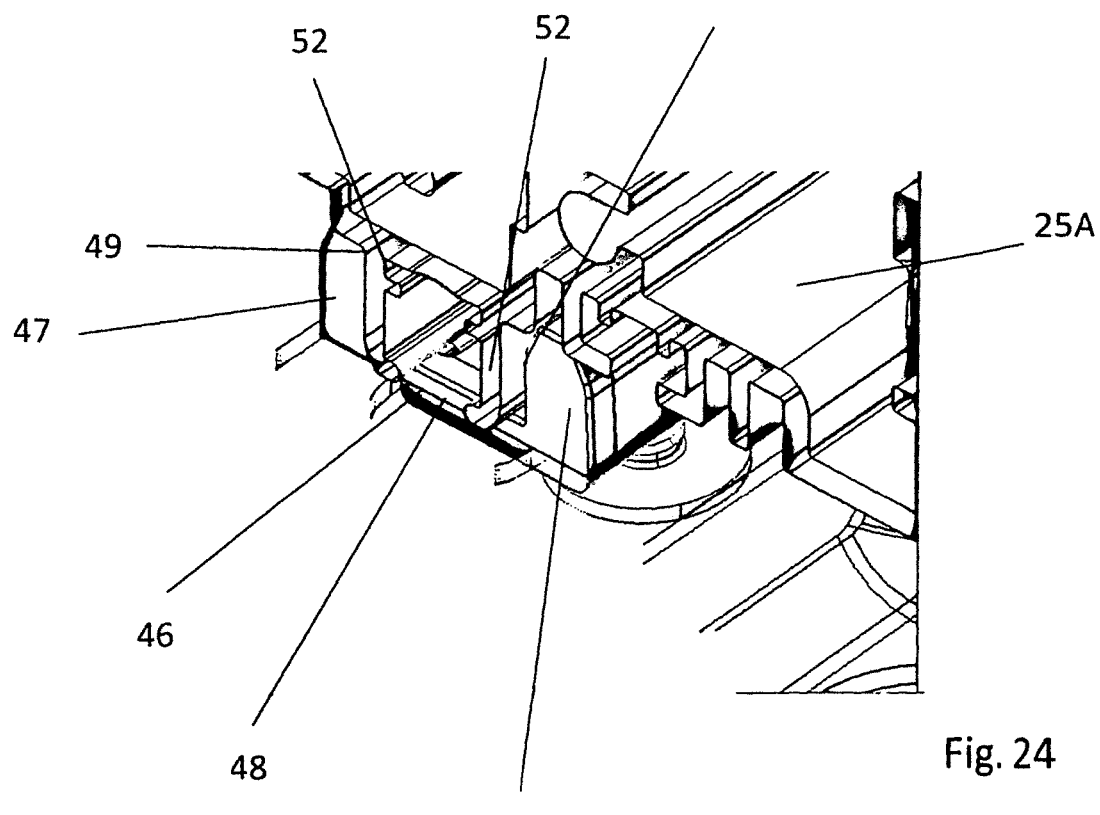

During pre-installation, roller blind assembly 15 illustrated in FIG. 5 is assembled. For this purpose, roller blind units 16 and 17, which are each composed of lateral bearing elements 30, roller blind web 18 and 19, respectively, pull bar 22 and 23, respectively, including pull bar sliders 33 pre-positioned in bearing elements 30, and winding shaft 31, are placed on bearing shell 24 in such a manner that retaining elements 64 and 65 are introduced into openings 59 of bearing shell 24 through insert portions 62 and 63 (cf. FIGS. 6, 7, 9, 10, 12, 13). Thus, bearing elements 30 rest on bearing shell 24. Then, bearing elements 30 are displaced in openings 59 until catches 44 catch in corresponding grooves 45 and retaining portions 64 of retaining elements 57 and 58 engage behind bearing shell 24 (cf. FIGS. 8, 11, 14). During displacement, bearing elements 30 slide on resilient sliding elements 43. Then, a positioning screw 51 is inserted into each mounting hole 50 of bearing elements 30. Thus, the pre-installation state illustrated in FIG. 17 is established.

Subsequently, bearing shell 24 is provided with fixing plates 28A and 28B (FIG. 5).

Figure 25:
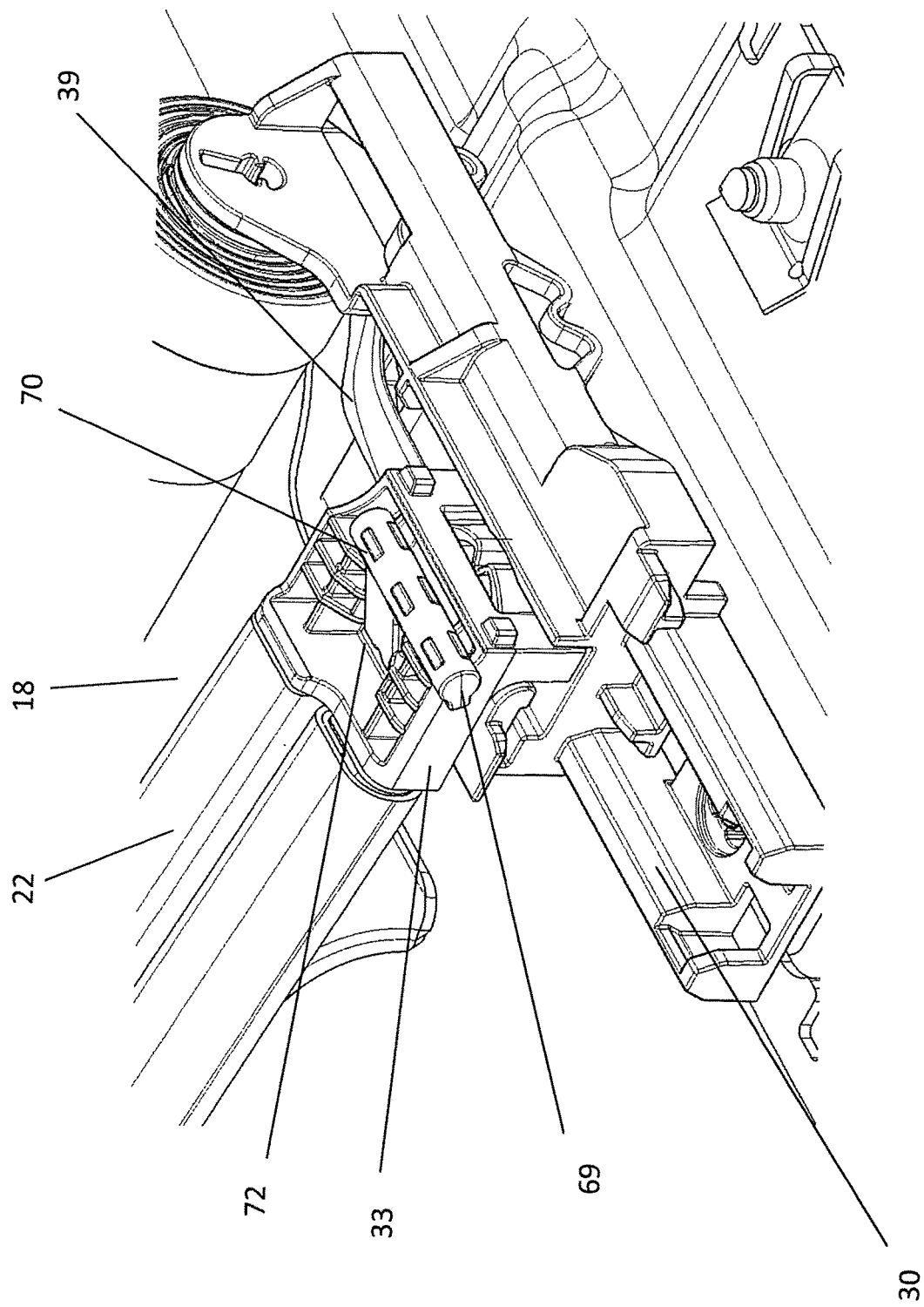
FIG. 25 shows a perspective view of the roller blind assembly in its state installed on the vehicle roof, but prior to final positioning of the roller blind unit.
Figure 26:
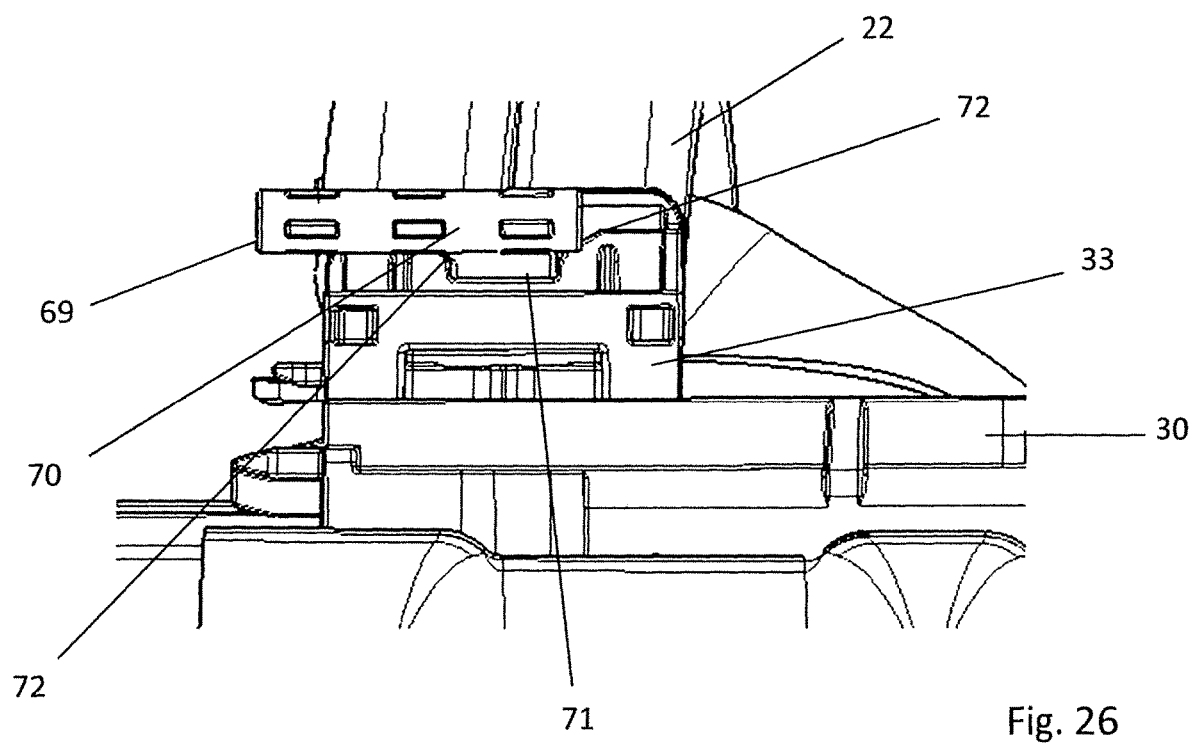
FIG. 26 shows a side view of the roller blind assembly installed on the vehicle roof.
Figure 27:
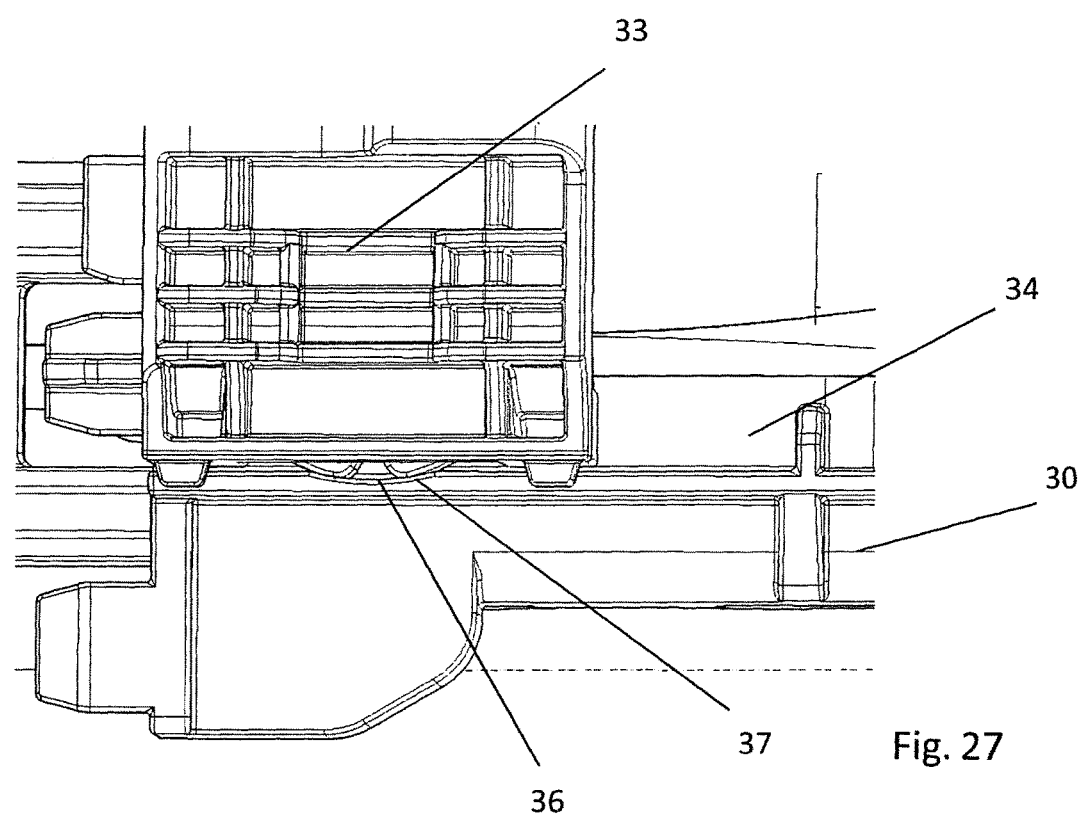
FIG. 27 shows a top view of the roller blind assembly in the area of a pull bar slider.
Figure 28:
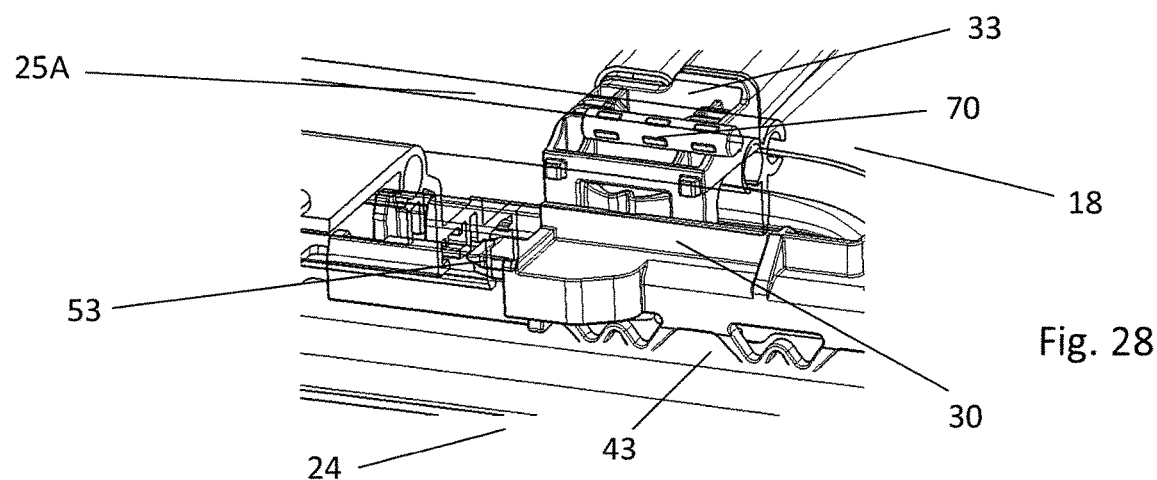
FIGS. 28 to 30 show perspective views of the roller blind assembly during final positioning of the roller blind unit.
Figure 29:
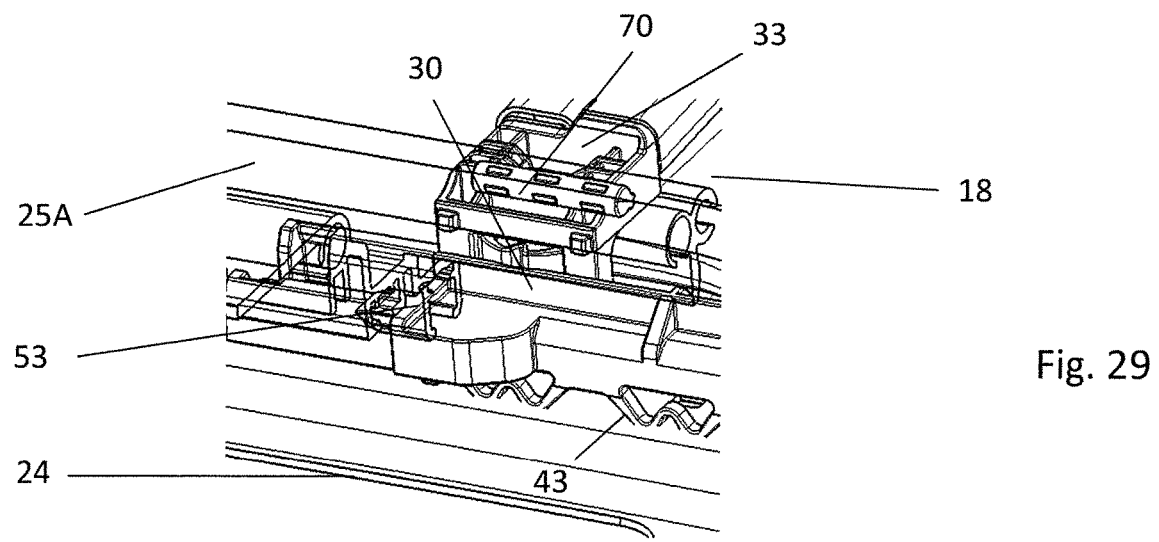
Figure 30:
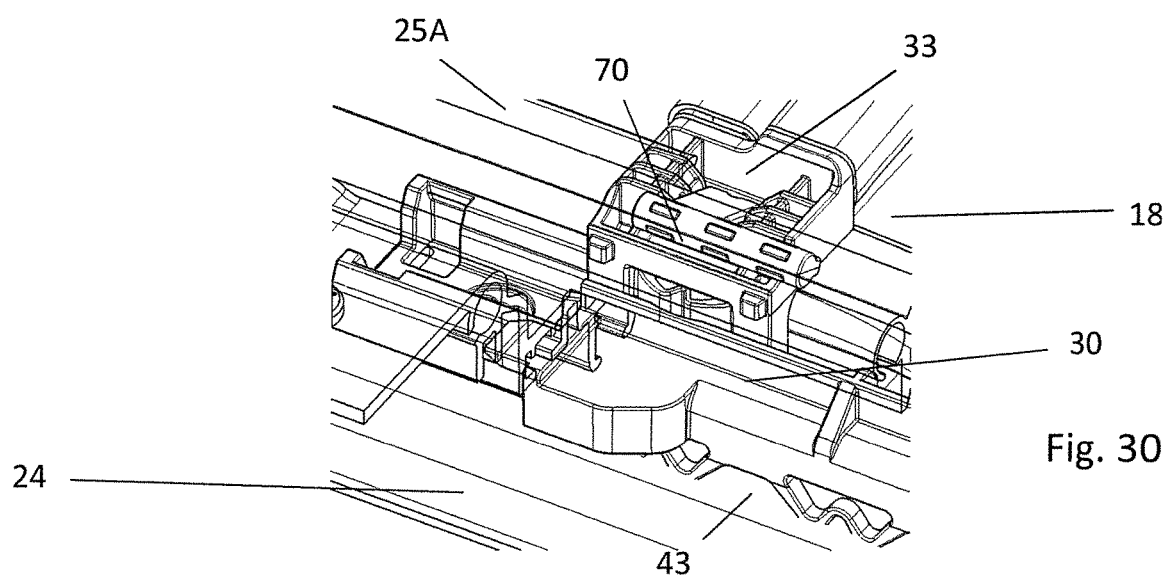

Pre-installed roller blind assembly 15 can now be introduced into a vehicle interior by means of a corresponding handling device and can be moved toward vehicle roof 10 from below (cf. FIG. 20). Webs 52 of guide rails 25A, 25B, 26A and 26B, which protrude downward, each engage into centering troughs 46 of bearing elements 30, whereby roller blind assembly 15 is pre-positioned in the transverse direction of the roof (cf. FIGS. 21, 23). When webs 52 come to bear on trough bottoms 48, pre-positioning in the vertical direction of the roof is achieved as well (cf. FIGS. 22, 24). As roller blind assembly 15 is being moved toward vehicle roof 10, coupling elements 70 of drive cable 69 also enter recesses 71 of pull bar sliders 33 from above (cf. FIGS. 25, 26). Pull bar sliders 33 can absorb tolerances by moving in guide tracks 34.

Then, bearing shell 24 can be screwed to guide rails 25A, 25B, 26A and 26B, which constitute the support portion, by means of fixing screws 27 already inserted into corresponding screw holes.

Once bearing shell 24 has been fixed to guide rails 25A, 25B, 26A and 26B and fixing plates 28A and 28B have been fixed to B-pillars 29 of the vehicle body, each bearing element 30 is shifted in the direction of assigned guide rail 25A, 25B, 26A or 26B on bearing shell 24. Centering pins 53, 54 and 55 enter the corresponding channels of guide rails 25A, 25B, 26A and 26B until end faces 56 of base bodies 41 of bearing elements 30 abut against the corresponding front ends of guide rails 25A, 25B, 26A and 26B. Then, positioning screws 51, which are held in mounting holes 50, can be screwed into a thread formed on respective guide rail 25A, 25B, 26A or 26B or formed by a nut disposed therein. Thus, the final installation position is reached, in which retaining portions 64 of retaining elements 57 and 58 engage behind bearing shell 24. This is illustrated by the picture sequences of FIGS. 28 to 30, 31 to 33, 34 to 36 and 37 to 39.

Roller blind assembly 15 can be now be actuated by means of drive cables 69.

REFERENCE SIGNS 10 vehicle roof
11 transparent roof portion
12 transparent roof portion
13 solid roof portion
14 solid roof portion
15 roller blind assembly
16 roller blind unit
17 roller blind unit
18 roller blind web
19 roller blind web
20 roller blind coil
21 roller blind coil
22 pull bar
23 pull bar
24 bearing shell
25A, B guide rail
26A, B guide rail
27 fixing screw
28A, B fixing plate
29 B-pillars
30 bearing element
31 winding shaft
32 bearing pin
33 pull bar slider
34 guide track
35 guide channel
36 catch depression
37 spring element
38 centering track
39 guide tape
40 channel
41 base body
42 protrusion
43 sliding element
44 catch
45 groove
46 centering trough
47 side wall
48 trough bottom
49 lead-in chamfer
50 mounting hole
51 positioning screw
52 web
53 centering pin
54 centering pin
55 centering pin
56 end face
57 retaining element
58 retaining element
59 opening
60 positioning rib
61 positioning slot
62 insert portion
63 insert portion
64 retaining portion
65 mounting portion
66 widened portion
67 slot portion
68 electric motor
69 drive cable
70 coupling element
71 recess
72 lead-in chamfer
331 connection tab
521 lead-in chamfer

The invention claimed is:

1. A vehicle roof, comprising: at least one transparent roof portion, a roof-attached support portion and a roller blind assembly for selectively shading or at least partially exposing the transparent roof portion, the roller blind assembly having at least one roller blind unit comprising a roller blind web, which can be wound up into a roller blind coil, and a lateral bearing element on either side of a vertical longitudinal center plane of the roof, the roller blind coil being disposed between the two lateral bearing elements, wherein the roller blind assembly comprises a bearing shell on top of which the at least one roller blind unit is attached via the lateral bearing elements and wherein the bearing shell is fixed to the at least one support portion from below; and wherein each bearing element comprises at least one centering pin disposed at the end and engaging into a roof-attached centering recess.

2. The vehicle roof according to claim 1, wherein the roller blind unit can be positioned relative to the bearing shell and to the support portion when the bearing shell is fixed to the roof-attached support portion.

3. The vehicle roof according to claim 1, wherein the bearing shell hast at least one positioning slot for each lateral bearing element, a positioning element, wherein the positioning element is a positioning rib of the respective bearing element, engaging into the positioning slot.

4. The vehicle roof according to claim 1, wherein each bearing element is provided with at least one retaining element which penetrates an opening of the bearing shell and engages below the same.

5. The vehicle roof according to claim 4, wherein the opening has a widened insert portion, whose dimensions are larger than the cross-dimensions of the retaining element, and a tapered mounting portion, whose dimensions are smaller than those of a retaining portion of the retaining element.

6. The vehicle roof according to claim 4, wherein the retaining element is a pin having an inversely T-shaped longitudinal section.

7. The vehicle roof according to claim 1, wherein each bearing element has at least one sliding element at its underside, the sliding element bearing on the bearing shell and being resilient.

8. The vehicle roof according to claim 1, wherein each bearing element has a catch which engages into a corresponding recess of the bearing shell when in a pre-installation position.

9. The vehicle roof according to claim 1, wherein the centering recess is formed by a guide rail profile with which an end face of the respective bearing element is in contact when in an installation position.

10. The vehicle roof according to claim 1, wherein each bearing element has two side walls between which a profile portion of a guide rail profile is received from above and between which a bearing element bottom is formed on which the profile portion rests when in an installation position, the side walls and the profile portion preferably each being provided with a lead-in chamfer.

11. A vehicle roof, comprising: at least one transparent roof portion, a roof-attached support portion and a roller blind assembly for selectively shading or at least partially exposing the transparent roof portion, the roller blind assembly having at least one roller blind unit comprising a roller blind web, which can be wound up into a roller blind coil, and a lateral bearing element on either side of a vertical longitudinal center plane of the roof, the roller blind coil being disposed between the two lateral bearing elements, wherein the roller blind assembly comprises a bearing shell on top of which the at least one roller blind unit is attached via the lateral bearing elements and wherein the bearing shell is fixed to the at least one support portion from below; and wherein each bearing element has a guide track for a pull bar slider, the guide track being aligned with a guide channel of a guide rail profile.

12. A vehicle roof, comprising: at least one transparent roof portion, a roof-attached support portion and a roller blind assembly for selectively shading or at least partially exposing the transparent roof portion, the roller blind assembly having at least one roller blind unit comprising a roller blind web, which can be wound up into a roller blind coil, and a lateral bearing element on either side of a vertical longitudinal center plane of the roof, the roller blind coil being disposed between the two lateral bearing elements, wherein the roller blind assembly comprises a bearing shell on top of which the at least one roller blind unit is attached via the lateral bearing elements and wherein the bearing shell is fixed to the at least one support portion from below; and wherein each bearing element has a centering track in which a lateral guide tape of the roller blind web is guided and which is aligned with a channel of the guide rail profile.

13. The vehicle roof according to claim 11, wherein each pull bar slider has a recess for a coupling element of a respective drive cable driven by a drive motor.

14. The vehicle roof according to claim 13, wherein the recess is open at the top and receives the coupling element without play in a longitudinal direction of the respective guide rail profile.

15. The vehicle roof according to claim 13, wherein each recess has lead-in chamfers for the respective coupling element.

16. The vehicle roof according to claim 13, wherein the coupling elements of the drive cables are guided in the guide rail profiles in a manner secured against twisting and each comprise a tongue which points in the direction of the vertical longitudinal center plane of the roof.

17. The vehicle roof according to claim 1,
wherein the bearing elements each comprise a bearing pin for a winding tube.

18. The vehicle roof according to claim 1, wherein the bearing shell is provided with a fixing plate on either side of the vertical longitudinal center plane of the roof via which it can be attached to the body.

19. The vehicle roof according to claim 1, wherein the bearing shell is screwed to guide rail profiles from below, which form the support portion.

20. The vehicle roof according to claim 19, wherein the bearing elements are screwed to the guide rail profiles from below.

21. The vehicle roof according to claim 1, wherein the roller blind assembly comprises two roller blind units which are disposed on the bearing shell.

22. The vehicle roof according to claim 1, wherein the support portion is formed by a frame of a roof opening system.

* * * * *